(12) United States Patent
Isaka et al.

(10) Patent No.: US 11,605,818 B2
(45) Date of Patent: Mar. 14, 2023

(54) ANODE MATERIAL FOR LITHIUM ION SECONDARY BATTERY, METHOD OF PRODUCING ANODE MATERIAL FOR LITHIUM ION SECONDARY BATTERY, ANODE FOR LITHIUM ION SECONDARY BATTERY, AND LITHIUM ION SECONDARY BATTERY

(71) Applicant: Hitachi Chemical Company, Ltd., Tokyo (JP)

(72) Inventors: Motohiro Isaka, Tokyo (JP); Hideyuki Tsuchiya, Tokyo (JP); Kento Hoshi, Tokyo (JP); Tsutomu Satoh, Tokyo (JP); Keita Suga, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 282 days.

(21) Appl. No.: 16/611,983

(22) PCT Filed: Jan. 29, 2018

(86) PCT No.: PCT/JP2018/002799
§ 371 (c)(1),
(2) Date: Nov. 8, 2019

(87) PCT Pub. No.: WO2018/207410
PCT Pub. Date: Nov. 15, 2018

(65) Prior Publication Data
US 2021/0135220 A1      May 6, 2021

(30) Foreign Application Priority Data
May 11, 2017   (WO) .................. PCT/JP2017/017959

(51) Int. Cl.
  *H01M 4/587*   (2010.01)
  *H01M 10/0525*   (2010.01)
  *H01M 4/02*   (2006.01)

(52) U.S. Cl.
  CPC ....... *H01M 4/587* (2013.01); *H01M 10/0525* (2013.01); *H01M 2004/027* (2013.01)

(58) Field of Classification Search
  CPC ............. H01M 4/587; H01M 10/0525; H01M 2004/027
  See application file for complete search history.

(56) References Cited

U.S. PATENT DOCUMENTS

| | | | |
|---|---|---|---|
| 9,450,246 B2 * | 9/2016 | Takahashi | ............... C01B 32/20 |
| 2013/0143127 A1 * | 6/2013 | Nakamura | ............ H01M 4/587 |
| | | | 429/231.8 |
| 2014/0093781 A1 | 4/2014 | Nishihara et al. | |

FOREIGN PATENT DOCUMENTS

| | | |
|---|---|---|
| CN | 103098274 A | 5/2013 |
| CN | 103596881 A | 2/2014 |
| JP | H04-370662 A | 12/1992 |
| JP | H05-307956 A | 11/1993 |
| JP | 2000-090930 A | 3/2000 |
| JP | 2002-270167 A | 9/2002 |
| JP | 2008-204886 A | 9/2008 |
| JP | 2010-034036 A | 2/2010 |
| JP | 2011-238622 A | 11/2011 |
| JP | 2014-165156 A | 9/2014 |
| JP | 2014-186956 A | 10/2014 |
| JP | 2016-13448 A | 1/2016 |
| JP | 2019-516891 A | 6/2019 |
| KR | 2012-0103575 A | 9/2012 |
| KR | 2013-0101002 A | 9/2013 |
| KR | 2014-0002793 A | 1/2014 |
| KR | 2015-0039826 A | 4/2015 |
| TW | 201220583 A | 5/2012 |
| WO | 2012/015054 A1 | 2/2012 |
| WO | 2012/137770 A1 | 10/2012 |
| WO | 2014/050097 A1 | 4/2014 |
| WO | 2015/037551 A1 | 3/2015 |
| WO | 2016/113952 A1 | 7/2016 |

* cited by examiner

*Primary Examiner* — Ula C Ruddock
*Assistant Examiner* — Thomas H. Parsons
(74) *Attorney, Agent, or Firm* — Fitch, Even, Tabin & Flannery, LLP

(57) ABSTRACT

An anode material for a lithium ion secondary battery including a carbon material satisfying the following (1) to (3), (6), and (7):
(1) an average particle size (D50) is 22 μm or less,
(2) D90/D10 of particle sizes is 2.2 or less,
(3) a linseed oil absorption amount is 50 mL/100 g or less,
(6) a portion of the carbon material with a sphericity of from 0.6 to 0.8 and a particle size of from 10 μm to 20 μm is 5% by number or more, and
(7) a portion of the carbon material with the sphericity of 0.7 or less and a particle size of 10 μm or less is 0.3% by number or less.

18 Claims, 4 Drawing Sheets

ANODE MATERIAL FOR LITHIUM ION SECONDARY BATTERY, METHOD OF PRODUCING ANODE MATERIAL FOR LITHIUM ION SECONDARY BATTERY, ANODE FOR LITHIUM ION SECONDARY BATTERY, AND LITHIUM ION SECONDARY BATTERY

CROSS-REFERENCE TO RELATED APPLICATIONS

This application is a U.S. national phase application filed under 35 U.S.C. § 371 of International Application No. PCT/JP2018/002799, filed Jan. 29, 2018, designating the United States, which claims priority from International Application No. PCT/JP2017/017959, filed May 11, 2017, the entire contents of which are hereby incorporated herein by reference.

TECHNICAL FIELD

The present invention relates to an anode material for a lithium ion secondary battery, a method of producing an anode material for a lithium ion secondary battery, an anode for a lithium ion secondary battery, and a lithium ion secondary battery.

BACKGROUND ART

A lithium ion secondary battery has been widely used in electronic devices, such as a laptop PC, a mobile phone, a smartphone, and a tablet PC, taking advantage of its characteristics of small size, light weight, and high energy density. In recent years, in the context of environmental problems such as global warming due to $CO_2$ emissions, a clean electric vehicle (EV) that runs solely on the battery, a hybrid electric vehicle (HEV) that combines a gasoline engine and the battery, and the like have become widespread. Also, recently, it is also used for electric power storage, and its applications are expanding in various fields.

The performance of an anode material for a lithium ion secondary battery greatly affects the characteristics of a lithium ion secondary battery. A carbon material is widely used as the material for an anode material for a lithium ion secondary battery. The carbon material used as an anode material is roughly divided into a graphite and a carbon material with a crystallinity lower than graphite (amorphous carbon, etc.). The graphite has a structure in which hexagonal planes of carbon atoms are regularly stacked, and when it is used as an anode material of a lithium ion secondary battery, an insertion or elimination reaction of a lithium ion proceeds at the edge of a hexagonal plane to perform charge or discharge.

Amorphous carbon has irregularly stacked hexagonal planes, or does not have hexagonal planes. Therefore, in an anode material using amorphous carbon, an insertion or elimination reaction of lithium ions proceeds on the entire surface of the anode material. Therefore, a lithium ion battery superior in input-output characteristics can be obtained more easily than a case where graphite is used as an anode material (see, for example, Patent Document 1 and Patent Document 2). On the other hand, since amorphous carbon is less crystalline than graphite, its energy density is lower than graphite.

CITATION LIST

Patent Documents

[Patent Document 1] Japanese Patent Application Laid-Open (JP-A) No. H4-370662
[Patent Document 2] JP-A No. H5-307956
[Patent Document 3] International Publication No. WO 2012/015054

SUMMARY OF INVENTION

Technical Problem

Considering the aforedescribed characteristics of a carbon material, an anode material has also been proposed in which amorphous carbon and graphite are complexed to improve input-output characteristics while maintaining the high energy density, and graphite is coated with amorphous carbon to reduce the surface reactivity to improve the input-output characteristics while maintaining favorably the initial charge and discharge efficiency (see for example, Patent Document 3). A lithium ion secondary battery to be used in an EV, a HEV, or the like is required to have high input-output characteristics for charging the power from regenerative braking and discharging for motor drive. Meanwhile, an automobile is vulnerable to the outside air temperature, and particularly in the summer a lithium ion secondary battery is exposed to high temperatures. Therefore, it is required to strike a balance between input-output characteristics and high temperature storage characteristics.

An object of an aspect of the invention is to provide an anode material for a lithium ion secondary battery suitable for producing a lithium ion secondary battery which is excellent in input-output characteristics and high temperature storage characteristics, a method of producing an anode material for a lithium ion secondary battery, and an anode for a lithium ion secondary battery.

Further, another object of an aspect of the invention is to provide a lithium ion secondary battery which is excellent in input-output characteristics and high temperature storage characteristics.

Solution to Problem

As a method for improving the input-output characteristics, for example, there is a method by which the particle size of an anode material for a lithium ion secondary battery is reduced. However, when the particle size is reduced, the high temperature storage characteristics tend to deteriorate, although the input-output characteristic are improved. The present inventors have conducted an intensive research to discover a means capable of striking a balance between the input-output characteristics and the high temperature storage characteristic which are in a trade-off relationship.

Examples of specific means for achieving the objects include the following embodiments.

<1> An anode material for a lithium ion secondary battery, the anode material comprising a carbon material satisfying the following (1) to (3):
(1) an average particle size (D50) is 22 μm or less;
(2) D90/D10 of particle sizes is 2.2 or less; and
(3) a linseed oil absorption amount is 50 mL/100 g or less.
<2> An anode material for a lithium ion secondary battery, the anode material comprising a carbon material satisfying the following (1), (2) and (4):

(1) an average particle size (D50) is 22 μm or less;
(2) D90/D10 of particle sizes is 2.2 or less; and
(4) a tap density is 1.00 g/cm³ or more.

<3> An anode material for a lithium ion secondary battery, the anode material comprising a carbon material satisfying the following (1), (2), and (5):
(1) an average particle size (D50) is 22 μm or less;
(2) D90/D10 of particle sizes is 2.2 or less; and
(5) in a case in which the carbon material is stirred in purified water containing a surfactant, and then irradiated with ultrasonic waves for 15 minutes with an ultrasonic cleaner, a ratio of D10 after the ultrasonic irradiation to D10 before the ultrasonic irradiation (D10 after ultrasonic irradiation/D10 before ultrasonic irradiation) is 0.90 or more.

<4> The anode material for a lithium ion secondary battery according to <1>, wherein the carbon material satisfies at least one of the following (4) or (5):
(4) a tap density is 1.00 g/cm³ or more;
(5) in a case in which the carbon material is stirred in purified water containing a surfactant, and then irradiated with ultrasonic waves for 15 minutes with an ultrasonic cleaner, a ratio of D10 after the ultrasonic irradiation to D10 before the ultrasonic irradiation (D10 after ultrasonic irradiation/D10 before ultrasonic irradiation) is 0.90 or more.

<5> The anode material for a lithium ion secondary battery according to <2>, wherein the carbon material satisfies at least one of the following (3) or (5):
(3) a linseed oil absorption amount is 50 mL/100 g or less;
(5) in a case in which the carbon material is stirred in purified water containing a surfactant, and then irradiated with ultrasonic waves for 15 minutes with an ultrasonic cleaner, a ratio of D10 after the ultrasonic irradiation to D10 before the ultrasonic irradiation (D10 after ultrasonic irradiation/D10 before ultrasonic irradiation) is 0.90 or more.

<6> The anode material for a lithium ion secondary battery according to <3>, wherein the carbon material satisfies at least one of the following (3) or (4):
(3) a linseed oil absorption amount is 50 mL/100 g or less;
(4) a tap density is 1.00 g/cm³ or more.

<7> The anode material for a lithium ion secondary battery according to any one of <1> to <6>, wherein an average interplanar spacing $d_{002}$ determined by an X-ray diffraction method is from 0.334 nm to 0.338 nm.

<8> The anode material for a lithium ion secondary battery according to any one of <1> to <7>, wherein an R value in Raman spectrometry is from 0.1 to 1.0.

<9> The anode material for a lithium ion secondary battery according to any one of <1> to <8>, wherein the carbon material does not have two or more exothermic peaks in a temperature range of from 300° C. to 1,000° C. in a differential thermal analysis in an air stream.

<10> The anode material for a lithium ion secondary battery according to any one of <1> to <9>, wherein a specific surface area of the carbon material determined from a nitrogen adsorption measurement at 77 K is from 2 m²/g to 8 m²/g.

<11> The anode material for a lithium ion secondary battery according to <10>, wherein a $CO_2$ adsorption amount per unit area calculated by the following Formula (a):

$CO_2$ adsorption amount per unit area (cm³/m²)=$A$ (cm³/g)/$B$ (m²/g)     Formula (a), in which A represents a value of $CO_2$ adsorption amount of the carbon material determined from carbon dioxide adsorption at 273 K, and B represents a value of a specific surface area of the carbon material determined by a nitrogen adsorption measurement at 77 K;
is from 0.01 cm³/m² to 0.10 cm³/m².

<12> The anode material for a lithium ion secondary battery according to any one of <1> to <11>, wherein the carbon material satisfies at least one of the following (6) or (7):
(6) a portion of the carbon material with a sphericity of from 0.6 to 0.8 and a particle size of from 10 μm to 20 μm is 5% by number or more;
(7) a portion of the carbon material with the sphericity of 0.7 or less and a particle size of 10 μm or less is 0.3% by number or less.

<13> The anode material for a lithium ion secondary battery according to <12>, wherein the carbon material satisfies (6) and (7).

<14> A method of producing an anode material for a lithium ion secondary battery, comprising a step of producing the carbon material according to any one of <1> to <13> by heat-treating a mixture containing a first carbon material that becomes a core of the carbon material and a precursor of a second carbon material having a crystallinity lower than the first carbon material.

<15> The method of producing the anode material for a lithium ion secondary battery according to <14>, wherein the mixture is heat-treated in the step in a range of from 950° C. to 1,500° C.

<16> An anode for a lithium ion secondary battery, comprising an anode material layer including the anode material for a lithium ion secondary battery according to any one of <1> to <13>, and a current collector.

<17> A lithium ion secondary battery, comprising the anode for a lithium ion secondary battery according to <16>, a cathode, and an electrolytic solution.

Advantageous Effects of Invention

In an aspect of the invention, an anode material for a lithium ion secondary battery suitable for producing a lithium ion secondary battery which is excellent in input-output characteristics and high temperature storage characteristics, a method of producing an anode material for a lithium ion secondary battery, and an anode for a lithium ion secondary battery can be provided.

Further, in an aspect of the invention, a lithium ion secondary battery which is excellent in input-output characteristics and high temperature storage characteristics can be provided.

DESCRIPTION OF EMBODIMENTS

Figure 1:
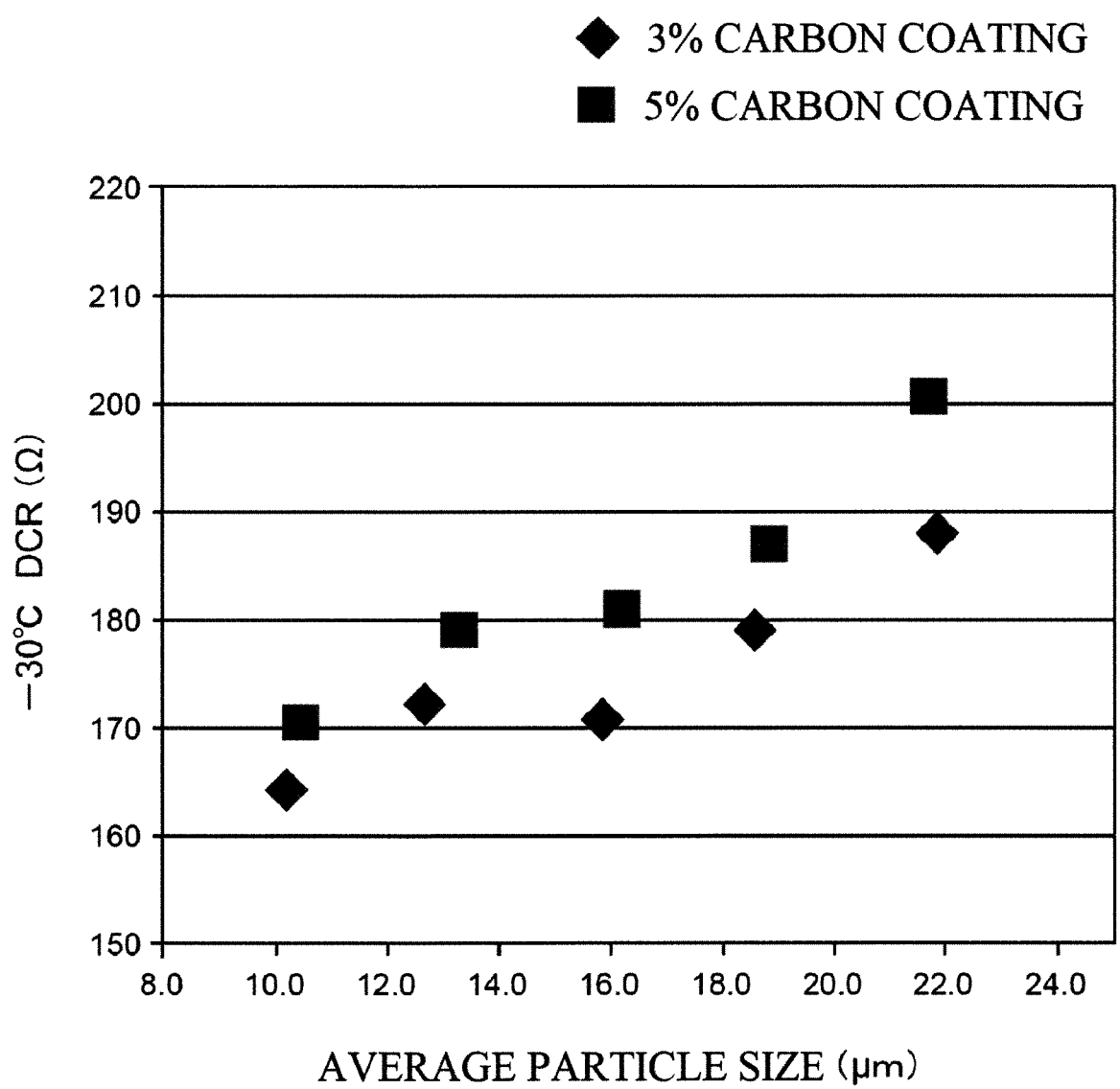
FIG. 1 is a graph showing the relationship between the average particle size of a carbon material and the output characteristic in each test.

Hereinafter, modes for carrying out the present invention will be described in detail. However, the present invention is not limited to the following embodiments. In the following embodiments, the constituent elements (including element steps and the like) are not essential unless otherwise specified. The same applies to numerical values and ranges thereof, and does not limit the present invention.

In the present specification, the term "step" includes, in addition to steps independent of other steps, such steps as long as the purpose of the step is achieved even if it cannot be clearly distinguished from other steps.

In the present specification, those numerical ranges that are expressed with "to" each denote a range that includes the numerical values stated before and after "to" as the minimum value and the maximum value, respectively.

In a set of numerical ranges that are stated stepwise in the present specification, the upper limit value or the lower limit value of a numerical range may be replaced with the upper limit value or the lower limit value of other numerical range. Further, in a numerical range stated in the present specification, the upper limit value or the lower limit value of the numerical range may be replaced with a value indicated in Examples.

In the present specification, when there are plural kinds of substances that correspond to a component of an anode material and a composition, the indicated content ratio and content of the component in the anode material and the composition means, unless otherwise specified, the total content ratio and content of the plural kinds of substances existing in the anode material and the composition.

In the present specification, when there are plural kinds of particles that correspond to a component of an anode material and a composition, the indicated particle size of the component in the anode material and the composition means, unless otherwise specified, a value determined for a mixture of the plural kinds of particles existing in the anode material and the composition.

In the present specification, the term "layer" includes, in addition to the case where the region is entirely formed, that when the region where the layer is present is observed, it is formed in only a part of the region.

In the present specification, the term "layered" refers to stacking layers, two or more layers may be combined, and two or more layers may be removable.

<Anode Material for a Lithium Ion Secondary Battery>

First Embodiment

An anode material for a lithium ion secondary battery of the first embodiment of the invention includes a carbon material satisfying the following (1) to (3):
(1) the average particle size (D50) is 22 μm or less,
(2) the D90/D10 of particle sizes is 2.2 or less, and
(3) the linseed oil absorption amount is 50 mL/100 g or less.

When an anode material for a lithium ion secondary battery satisfies the above (1) to (3), a lithium ion secondary battery excellent in input-output characteristics and high temperature storage characteristics can be produced.

Further when the above (1) to (3) are satisfied, the tap density of a carbon material tends to be enhanced. In a case where the tap density of a carbon material is enhanced, when an anode material for a lithium ion secondary battery is applied to a current collector, the electrode density becomes higher, and a press pressure necessary for obtaining the target electrode density of the anode for a lithium ion secondary battery tends to be reducible. When the press pressure is reduced, the lateral orientation of a carbon material is decreased, and intake and discharge of a lithium ion at the time of charge and discharge becomes easier, so that a lithium ion secondary battery further superior in input-output characteristics tends to become producible.

Since a carbon material repeats expansion and contraction in a lithium ion secondary battery due to charge and discharge, in a case where the adherence between a carbon material and a current collector is low, there is a risk that the carbon material may be detached from the current collector to reduce the discharge capacity and to decrease the cycling characteristics. In contrast, in the case of an anode material for a lithium ion secondary battery of the present embodiment, since the tap density of a carbon material is enhanced, the adherence between the carbon material, which is an anode active material, and a current collector tends to be enhanced. Therefore, by using an anode material for a lithium ion secondary battery of the present embodiment, even when the carbon material repeats expansion and contraction due to charge and discharge, the adherence between a carbon material and a current collector can be maintained, so that a lithium ion secondary battery superior in high temperature storage characteristics and life properties such as cycling characteristics tends to be producible.

Furthermore, since the adherence between a carbon material and a current collector is high in an anode material for a lithium ion secondary battery, the amount of a binder needed for producing an anode can be reduced, so that a lithium ion secondary battery superior in energy density tends to be produced at a low cost.

The constitution of an anode material for a lithium ion secondary battery of the first embodiment will be described in more detail below.

[Carbon Material]

The anode material for a lithium ion secondary battery (hereinafter, also simply referred to as "anode material") of the first embodiment includes a carbon material satisfying the above (1) to (3). There is no particular restriction on the content ratio of a carbon material in the anode material, and it is preferably 50% by mass or more, more preferably 80% by mass or more, further preferably 90% by mass or more, and especially preferably 100% by mass.

The anode material may include a carbon material other than the carbon material satisfying the above (1) to (3). There is no particular restriction on such other carbon material, and examples thereof include natural graphite in a scaly, earthy, or spherical form, graphite such as artificial graphite, amorphous carbon, carbon black, fibrous carbon, and nano carbon. Such other carbon materials may be used singly or in combination of two or more kinds thereof. Further, the anode material may include a particle containing an element that can occlude and release a lithium ion. Examples of an element that can occlude and release a lithium ion include, without limitation, Si, Sn, Ge, and In.

The average particle size (D50) of a carbon material is 22 μm or less. The average particle size (D50) of a carbon material is preferably 17 μm or less, more preferably 15 μm or less, and further preferably 13 μm or less from the viewpoint of further improving input-output characteristics of a lithium ion secondary battery by suppressing increase in the diffusion length of a lithium ion from the surface to the inside of an anode material. From the viewpoint of easier availability of a carbon material excellent in tap density, the average particle size (D50) of a carbon material is preferably 5 μm or more, more preferably 7 μm or more, and further preferably 9 μm or more.

The average particle size (D50) of a carbon material is a particle size corresponding to a cumulative percentage of 50% on a cumulative volume distribution curve drawn from the small diameter side with respect to a particle size distribution of the carbon material. An average particle size (D50) can be measured, for example, by dispersing a carbon material in purified water containing a surfactant, and using a laser diffraction particle size distribution analyzer (for example, SALD-3000J, manufactured by Shimadzu Corporation).

The D90/D10 of the particle sizes of a carbon material is 2.2 or less. The D90/D10 of the particle sizes of a carbon material is preferably 2.0 or less, more preferably 1.8 or less, and further preferably 1.6 or less, from the viewpoint of easier availability of a carbon material excellent in tap density, and suppression of aggregation of carbon material particles. There is no particular restriction on the lower limit of D90/D10 of the particle sizes of a carbon material insofar as it is 1.0 or more. For example, it is preferably 1.3 or more from the viewpoint that the interparticle contact is good and the input-output characteristics and the cycling characteristics are superior.

The particle size (D10) of a carbon material is a particle size corresponding to a cumulative percentage of 10% on a cumulative volume distribution curve drawn from the small diameter side with respect to a particle size distribution of the carbon material, and the particle size (D90) of a carbon material is a particle size corresponding to a cumulative percentage of 90% on a cumulative volume distribution curve drawn from the small diameter side with respect to a particle size distribution of the carbon material. A particle size (D10) and a particle size (D90) can be measured by placing purified water containing 0.06 g of a carbon material and a surfactant (trade name: LIPONOL T/15, produced by Lion Corporation) at a mass ratio of 0.2% in a test tube (12 mm×120 mm, manufactured by Maruemu Corporation), stirring the same with a test tube mixer (PASOLINA NS-80, manufactured by AS ONE Corporation) for 20 sec, and performing a measurement with a laser diffraction particle size distribution analyzer (for example, SALD-3000J, manufactured by Shimadzu Corporation).

The linseed oil absorption amount of a carbon material is 50 mL/100 g or less. The linseed oil absorption amount of a carbon material is preferably 48 mL/100 g or less, more preferably 47 mL/100 g or less, and further preferably 45 mL/100 g or less, from the viewpoint of enhancing the tap density of a carbon material and improving the input-output characteristics and cycling characteristics of a lithium ion secondary battery. There is no particular restriction on the lower limit of a linseed oil absorption amount of a carbon material, and it may be for example 35 mL/100 g or more, or 40 mL/100 g or more.

A linseed oil absorption amount of a carbon material can be measured in the present disclosure, by using a linseed oil (produced by Kanto Chemical Co., Ltd.) instead of dibutyl phthalate (DBP) as a liquid reagent according to JIS K 6217-4: 2008 "Carbonblack for rubber industry—Fundamental characteristics—, Part 4: Determination of oil absorption number and oil absorption number of compressed sample". The linseed oil is dropped to a carbon powder under test from a constant rate burette, and the change in viscosity characteristics is measured with a torque detector. The addition amount of the liquid reagent per unit mass of the carbon material at a torque corresponding to 70% of the maximum torque generated is defined as the linseed oil absorption amount (mL/100 g). For the measurement, for example, an absorption amount measuring apparatus of Asahisouken Corp. may be used.

It is preferable that a carbon material satisfies at least one of the following (4) or (5) in addition to the above (1) to (3):
(4) a tap density is 1.00 $g/cm^3$ or more,
(5) in a case in which the carbon material is stirred in purified water containing a surfactant, and then irradiated with ultrasonic waves for 15 minutes with an ultrasonic cleaner, a ratio of D10 after the ultrasonic irradiation to D10 (the same as the particle size (D10) of a carbon material in (2) above) before the ultrasonic irradiation (D10 after ultrasonic irradiation/D10 before ultrasonic irradiation) is 0.90 or more.

When a carbon material satisfies at least one of the above (4) and (5), a lithium ion secondary battery superior in input-output characteristics and cycling characteristics can be produced.

More particularly, when the above (4) is satisfied, the press pressure necessary for achieving an intended electrode density in an anode for a lithium ion secondary battery tends to be reducible. In this way a lithium ion secondary battery superior in input-output characteristics tends to become producible. Furthermore, when the above (4) is satisfied, a lithium ion secondary battery superior in adherence between a carbon material and a current collector and in cycling characteristics tends to become producible.

When the above (5) is satisfied, the change rate in D10 before and after ultrasonic irradiation of a carbon material is small. Namely, aggregation of carbon material particles is further suppressed, and the sphericity of a carbon material tends to become higher. As a result, there is a tendency that the tap density of carbon material becomes excellent, and the input-output characteristics and cycling characteristics of an anode for a lithium ion secondary battery become superior.

The tap density of a carbon material is more preferably 1.02 $g/cm^3$ or more, and further preferably 1.05 $g/cm^3$ or more from the viewpoint of superior cycling characteristics and energy density of a lithium ion secondary battery.

The value of a tap density of a carbon material tends to be increased, for example, by increasing the average particle size (D50) of a carbon material, decreasing the D90/D10 of particle sizes of a carbon material, decreasing the absorption amount of a linseed oil, or the like to the extent that the above (1) to (3) are satisfied.

The tap density of a carbon material means hereunder a value determined from the mass and the volume of a powder sample after charging a 100 $cm^3$ of a powder sample into a graduated flat bottom test tube with a volume of 150 $cm^3$ (KRS-406, manufactured by Kuramochi Scientific Instruments Seisakusho), closing the graduated flat bottom test tube with a stopper, and dropping the graduated flat bottom test tube 250 times from a height of 5 cm.

The D10 after ultrasonic irradiation/D10 before ultrasonic irradiation is more preferably 0.92 or more, and further preferably 0.95 or more from the viewpoint of further suppressing aggregation of carbon material particles, and further enhancing the sphericity of a carbon material.

In this regard, there is no particular restriction on the upper limit of the D10 after ultrasonic irradiation/D10 before ultrasonic irradiation, and it may be for example 1.0 or less.

A sample used for a measurement of D10 after ultrasonic irradiation in the above (5) is obtained as follows.

Purified water containing 0.06 g of a carbon material and a surfactant (trade name: LIPONOL T/15, produced by Lion Corporation) at a mass ratio of 0.2% is placed in a test tube (12 mm×120 mm, manufactured by Maruemu Corporation), and stirred with a test tube mixer (PASOLINA NS-80, manufactured by AS ONE Corporation) for 20 sec. Thereafter, the test tube is fixed in an ultrasonic cleaning machine (US-102, manufactured by SND Company Limited), purified water is added into the ultrasonic cleaning machine such that the solution in the test tube is immersed therein, and ultrasonic waves are radiated for 15 minutes (high frequency output of 100 W, and oscillatory frequency of 38 kHz). In this way a sample used for a measurement of D10 after ultrasonic irradiation is obtained.

The measuring method for a D10 before ultrasonic irradiation, or a D10 after ultrasonic irradiation of a carbon material is the same as the aforedescribed measuring method for a particle size (D10) of a carbon material.

A carbon material preferably satisfies at least one of the following (6) or (7) and more preferably satisfies the following (6) and (7), in addition to the above (1) to (3):

(6) in a portion of the carbon material with a sphericity of from 0.6 to 0.8 and a particle size of from 10 μm to 20 μm is 5% by number or more, and (7) in a portion of the carbon material with the sphericity of 0.7 or less and a particle size of 10 μm or less is 0.3% by number or less.

When the above (6) is satisfied, there is a predetermined amount of a carbon material with a sphericity of from 0.6 to 0.8, so that the interparticle contact area can be increased, and as a result an electrode having a low electrical resistance tends to be obtained. When an electrode having a low electrical resistance is obtained, a lithium ion secondary battery, which is excellent in input-output characteristics, tends to be obtained. Further, since there is a predetermined amount of a carbon material with a particle size of from 10 μm to 20 μm, the press pressure at the time of producing the electrode is transferred from the surface of a coated surface to particles in the vicinity of a current collector in a highly uniform state, so that an electrode superior in uniformity of electrode density tends to be obtained. When the uniformity of electrode density is superior a lithium ion secondary battery which is excellent in input-output characteristics tends to be obtained.

When the above (7) is satisfied, there is a tendency that the adherence between an anode material and a current collector is resistant to deterioration, and an electrode superior in adherence between an anode material and a current collector can be obtained. When the adherence between an anode material and a current collector is excellent, a lithium ion secondary battery superior in input-output characteristics, high temperature storage characteristics, and life properties such cycling characteristics tends to be obtained.

The portion having a sphericity of from 0.6 to 0.8 and a particle size of from 10 μm to 20 μm is more preferably from 5% by number to 20% by number in the total carbon material, and further preferably from 7% by number to 15% by number from the viewpoint of the balance between the electrical resistance of an electrode and the adherence between an anode material and a current collector.

The portion having a sphericity of 0.7 or less and a particle size of 10 μm or less is more preferably 0.25% by number or less in the total carbon material, and further preferably 0.2% by number or less from the viewpoint of improving the adherence between an anode material and a current collector.

The sphericity of a carbon material and the portion of particle sizes within a predetermined range may be measured hereunder with a wet and flow type particle size and shape analyzer. For example, the particle size and the sphericity of a carbon material are measured, for example, by setting the particle size in a range of from 0.5 μm to 200 μm, and the sphericity in a range of from 0.2 to 1.0. From the measurement data, the portion having a sphericity of from 0.6 to 0.8, the portion having a particle size of from 10 μm to 20 μm, and the portion having a sphericity of 0.7 or less, and a particle size of 10 μm or less are respectively calculated.

A measurement may be conducted using an FPIA-3000 (manufactured by Malvern Panalytical). As a pretreatment of this measurement, purified water containing 0.06 g of a carbon material and a surfactant (trade name: LIPONOL T/15, produced by Lion Corporation) at a mass ratio of 0.2% is placed in a test tube (12 mm×120 mm, manufactured by Maruemu Corporation), and stirred with a test tube mixer (PASOLINA NS-80, manufactured by AS ONE Corporation) for 20 sec, and then, if necessary, may be ultrasonically stirred for 1 min. As an ultrasonic cleaning machine US-102 manufactured by SND Company Limited (high frequency output of 100 W, and oscillatory frequency of 38 kHz) may be used.

The average interplanar spacing $d_{002}$ determined by X-ray diffraction method of a carbon material is preferably from 0.334 nm to 0.338 nm. When the average interplanar spacing $d_{002}$ is 0.338 nm or less, the initial charge/discharge efficiency and energy density in a lithium ion secondary battery tends to be excellent.

The theoretical value of the average interplanar spacing $d_{002}$ of a graphite crystal is 0.3354 nm, and as a $d_{002}$ value is closer to that value, the energy density tends to increase.

The average interplanar spacing $d_{002}$ of a carbon material may be calculated using the Bragg's equation from a diffraction peak attributable to the carbon 002 plane to appear near the diffraction angle 2θ from 24° to 27° in a diffraction profile obtained by irradiating a sample with an X-ray (CuKα line), and measuring the diffraction line with a goniometer.

The value of the average interplanar spacing $d_{002}$ of a carbon material tends to decrease, for example, by increasing the temperature of a heat treatment at the time of producing an anode material. Therefore, by adjusting the temperature of the heat treatment at the time of producing an anode material, the average interplanar spacing $d_{002}$ of a carbon material can be controlled.

(R Value of Raman Spectrometry)

The R value from Raman spectrometry on a carbon material is preferably from 0.1 to 1.0, more preferably from 0.2 to 0.8, and further preferably from 0.3 to 0.7. When the R value is 0.1 or more, there exist sufficient number of lattice defects in graphite used for intake and discharge of a lithium ion, so that decrease in the input-output characteristics tends to be suppressed. When the R value is 1.0 or less, a decomposition reaction of an electrolytic solution is adequately suppressed, so that decrease in the initial efficiency tends to be suppressed.

The R value in a Raman spectrum obtained in Raman spectrometry is defined as an intensity ratio (Id/Ig) of the intensity Id of the maximum peak near 1360 $cm^{-1}$ to the intensity Ig of the maximum peak near 1580 $cm^{-1}$. Here, the peak appearing near 1580 $cm^{-1}$ is a peak generally attributed to a graphite crystal structure, and means, for example, a peak observed in a range of from 1530 $cm^{-1}$ to 1630 $cm^{-1}$. Further, the peak appearing near 1360 $cm^{-1}$ is usually a peak attributed to an amorphous structure of carbon, and means, for example, a peak observed in a range of from 1300 $cm^{-1}$ to 1400 $cm^{-1}$.

The Raman spectrometry is carried out hereunder using a laser Raman spectrophotometer (Model number: NRS-1000, JASCO Corporation), by irradiating a sample plate of an anode material for a lithium ion secondary battery set flatwise with argon laser light. The measurement conditions are as follows.

Wavelength of argon laser light: 532 nm
Wavenumber resolution: 2.56 cm$^{-1}$
Measurement range: from 1180 cm$^{-1}$ to 1730 cm$^{-1}$
Peak research: background removal The specific surface area of a carbon material determined by a nitrogen adsorption measurement at 77 K (hereinafter also referred to as "$N_2$ specific surface area") is preferably from 2 m$^2$/g to 8 m$^2$/g, more preferably from 2.5 m$^2$/g to 7 m$^2$/g, and further preferably from 3 m$^2$/g to 6 m$^2$/g. When the $N_2$ specific surface area is within the above range, a favorable balance between input-output characteristics and initial charge/discharge efficiency in a lithium ion secondary battery tends to be obtained. Specifically, a $N_2$ specific surface area can be determined from an adsorption isotherm, which is obtained by a nitrogen adsorption measurement at 77 K, using the BET method.

A $CO_2$ adsorption amount per unit area calculated by the following Formula (a):

$$CO_2 \text{ adsorption amount per unit area (cm}^3/\text{m}^2) = A \text{ (cm}^3/\text{g)}/B \text{ (m}^2/\text{g)} \quad \text{Formula (a)}$$

in which A represents a value of $CO_2$ adsorption amount of a carbon material determined from the carbon dioxide adsorption at 273 K (hereinafter also referred to as "$CO_2$ adsorption amount"), and B represents the aforedescribed value of a $N_2$ specific surface area, is preferably from 0.01 cm$^3$/m$^2$ to 0.10 cm$^3$/m$^2$, more preferably from 0.03 cm$^3$/m$^2$ to 0.08 cm$^3$/m$^2$, and further preferably from 0.04 cm$^3$/m$^2$ to 0.06 cm$^3$/m$^2$. Within the above range, favorable balance between the input-output characteristics and the high temperature storage characteristics (or initial charge/discharge efficiency) of a lithium ion secondary battery tends to be obtained. Furthermore, when the $CO_2$ adsorption amount per unit area is 0.10 cm$^3$/m$^2$ or less, the irreversible capacity generated by a side reaction with an electrolytic solution tends to be reduced, and decrease in the initial efficiency tends to be suppressed. In this regard, as the $CO_2$ adsorption amount, a value at a measurement temperature of 273 K, and a relative pressure $P/P_0 = 3.0 \times 10^{-2}$ (P=equilibration pressure, $P_0$=26142 mmHg (3.49 MPa)) is used.

A carbon material preferably does not have two or more exothermic peaks in a temperature range of from 300° C. to 1000° C. in a differential thermal analysis (DTA analysis) in an air stream. In this way, the input-output characteristics and high temperature storage characteristics in a lithium ion secondary battery tend to be further improved.

In this regard, the expression that a carbon material does not have two or more exothermic peaks means that there are not a plurality of distinguishable exothermic peaks in a temperature range of from 300° C. to 1000° C., namely there is no or only one distinguishable exothermic peak. In this regard, the expression that there are a plurality of distinguishable exothermic peaks means that there are a plurality of distinguishable exothermic peaks, which peaks are apart by at least 5° C.

A measurement by a differential thermal analysis (DTA analysis) can be conducted hereunder using a simultaneous thermogravimetric and differential thermal analyzer (for example, EXSTAR TG/DTA 6200, manufactured by Seiko Instruments Inc.). Specifically, a measurement is performed in a dry air stream of 300 mL/min at a rate of temperature increase of 2.5° C./min using α-alumina as a reference, and presence of an exothermic peak in DTA in a range of from 300° C. to 1000° C. is examined.

There is no particular restriction on a carbon material, and examples thereof include graphite, low crystalline carbon, amorphous carbon, and mesophase carbon. Examples of graphite include artificial graphite, natural graphite, graphitized mesophase carbon, and graphitized carbon fiber. As a carbon material, a spherical graphite particle is preferable, because the charge and discharge capacity of a lithium ion secondary battery is excellent and the tap density is excellent, and spherical artificial graphite, spherical natural graphite, and the like are more preferable.

In addition, by using spherical graphite particles, aggregation of graphite particles can be suppressed, and even when graphite particles are coated with a carbon material with lower crystallinity (for example, amorphous carbon), the graphite particles may be coated favorably. Further, exposure of areas, which have been not coated with the aforedescribed carbon material, is suppressed, when an anode material composition is prepared using a carbon material aggregated at the time of coating, and such aggregation of the carbon material is broken by stirring. As a result, when a lithium ion secondary battery is produced, a decomposition reaction of an electrolytic solution on the surface of a carbon material may be suppressed and decrease in the initial efficiency tends to be suppressed.

There may be a single kind of carbon material which is contained in an anode material, or may be two or more kinds.

A carbon material may contain the first carbon material that becomes a core of the carbon material, and the second carbon material which is present on at least part of the surface of the first carbon material and has a lower crystallinity than the first carbon material. There is no particular restriction on the first carbon material and the second carbon material, insofar as a condition that the second carbon material has a lower crystallinity than the first carbon material is satisfied, and for example they may be selected appropriately from the aforedescribed examples of carbon materials. Each of the first carbon material and the second carbon material may be consisting of a single kind, or two or more kinds.

The presence of the second carbon material on the surface of the first carbon material can be confirmed by transmission electron microscopy.

From the viewpoint of improving the input-output characteristics of a lithium ion secondary battery, the second carbon material preferably contains at least one of crystalline carbon and amorphous carbon. Specifically, it is preferably at least one kind selected from the group consisting of a carbonaceous substance obtained from an organic compound which may be changed to a carbonaceous matter by a heat treatment (hereinafter, also referred to as "precursor of the second carbon material") and carbonaceous particles.

There is no particular restriction on the precursor of the second carbon material, and examples thereof include pitch, and an organic polymer compound. Examples of the pitch include ethylene heavy end pitch, crude oil pitch, coal tar pitch, asphalt cracking pitch, pitch produced by thermal cracking of poly(vinyl chloride), and pitch produced by polymerizing naphthalene in the presence of a super strong acid. Examples of the organic polymer compound include a thermoplastic resin, such as poly(vinyl chloride), poly(vinyl alcohol), poly(vinyl acetate), and poly(vinyl butyral), and a natural substance, such as starch, and cellulose.

There is no particular restriction on the carbonaceous particle used as the second carbon material are not particularly limited, and examples thereof include particles of acetylene black, oil furnace black, ketjen black, channel black, thermal black, and amorphous graphite.

In a case where a carbon material includes the first carbon material and the second carbon material, there is no particular restriction on the content ratio between the first carbon material and the second carbon material in the carbon material. From the viewpoint of improving the input-output characteristics of a lithium ion secondary battery, the content ratio of the second carbon material with respect to the total mass of the carbon material is preferably from 0.1% by mass to 15% by mass, more preferably from 1% by mass to 10% by mass, and further preferably from 1% by mass to 5% by mass.

When the amount of the second carbon material in a carbon material is calculated from the amount of the precursor of the second carbon material, it can be calculated by multiplying the amount of the precursor of the second carbon material by the residual carbon ratio (% by mass). The residual carbon ratio of the precursor of the second carbon material can be found by heat-treating the precursor of the second carbon material alone (or in a mixture of the precursor of the second carbon material and the first carbon material at a predetermined ratio) at a temperature at which the precursor of the second carbon material can be changed to a carbonaceous matter, and calculating the ratio from the mass of the precursor of the second carbon material before the heat treatment, and the mass of the carbonaceous material derived from the precursor of the second carbon material after the heat treatment determined by a thermogravimetric analysis, or the like.

Next, anode materials for a lithium ion secondary battery in the second embodiment and the third embodiment of the invention will be described. Since preferable numerical ranges, measurement methods, etc. regarding the average particle size (D50) of a carbon material, the D90/D10 of particle sizes, the linseed oil absorption amount, the tap density, the D10 after ultrasonic irradiation/D10 before ultrasonic irradiation, the average interplanar spacing $d_{002}$, the R value, the $N_2$ specific surface area, and the $CO_2$ adsorption amount with respect to carbon materials used in the second embodiment and the third embodiment are the same as in the first embodiment, further description thereof will be omitted.

Further, with respect to carbon materials used in the second embodiment and the third embodiment, it is preferable that there are not two or more exothermic peaks in a temperature range of from 300° C. to 1000° C. in a differential thermal analysis (DTA analysis) in an air stream as in the first embodiment. As carbon materials to be used in the second embodiment and the third embodiment, a carbon material specifically described in the first embodiment may be used.

Second Embodiment

An anode material for a lithium ion secondary battery of the second embodiment of the invention includes a carbon material satisfying the following (1), (2) and (4):
(1) the average particle size (D50) is 22 μm or less,
(2) the D90/D10 of particle sizes is 2.2 or less, and
(4) the tap density is 1.00 g/cm³ or more.

When an anode material for a lithium ion secondary battery satisfies the above (1), (2), and (4), a lithium ion secondary battery excellent in input-output characteristics and high temperature storage characteristics can be produced.

More specifically, when the above (1) is satisfied, a lithium ion secondary battery, which is excellent in input-output characteristics, tends to become producible.

When the above (2) is satisfied, a lithium ion secondary battery, which is excellent in tap density, can be easily obtained, so that a carbon material which satisfies the above (4) can be easily obtained. When the above (4) is satisfied, the tap density of a carbon material is enhanced, the electrode density becomes higher when an anode material for a lithium ion secondary battery is applied to a current collector, and a press pressure necessary for obtaining the target electrode density of the anode for a lithium ion secondary battery tends to be reducible. When the press pressure is reduced, the lateral orientation of a carbon material is decreased, and intake and discharge of a lithium ion at the time of charge and discharge becomes easier, so that a lithium ion secondary battery further superior in input-output characteristics tends to become producible.

Since a carbon material repeats expansion and contraction in a lithium ion secondary battery due to charge and discharge, in a case where the adherence between a carbon material and a current collector is low, there is a risk that the carbon material may be detached from the current collector to reduce the discharge capacity and to decrease the cycling characteristics. In contrast, in the case of an anode material for a lithium ion secondary battery of the present embodiment, since the tap density of a carbon material is enhanced, the adherence between the carbon material, which is an anode active material, and a current collector tends to be enhanced. Therefore, by using an anode material for a lithium ion secondary battery of the present embodiment, even when the carbon material repeats expansion and contraction due to charge and discharge, the adherence between a carbon material and a current collector can be maintained, so that a lithium ion secondary battery superior in cycling characteristics tends to become producible.

Furthermore, since the adherence between a carbon material and a current collector is high in an anode material for a lithium ion secondary battery, the amount of a binder needed for producing an anode can be reduced, so that a lithium ion secondary battery superior in energy density tends to be produced at a low cost.

It is preferable that a carbon material satisfies at least one of the following (3) and (5) in addition to the above (1), (2), and (4):
(3) the linseed oil absorption amount is 50 mL/100 g or less, and
(5) in a case in which the carbon material is stirred in purified water containing a surfactant, and then irradiated with ultrasonic waves for 15 minutes with an ultrasonic cleaner, a ratio of D10 after the ultrasonic irradiation to D10 (the same as the particle size (D10) of a carbon material in (2) above) before the ultrasonic irradiation (D10 after ultrasonic irradiation/D10 before ultrasonic irradiation) is 0.90 or more.

When a carbon material satisfies at least one of the above (3) and (5), a lithium ion secondary battery superior in input-output characteristics and cycling characteristics can be produced.

It is preferable that a carbon material satisfies at least one of the following (6) or (7) in addition to the above (1), (2) and (4), and more preferable that it satisfies the following (6) and (7):

(6) in a portion of the carbon material with a sphericity of from 0.6 to 0.8 and a particle size of from 10 μm to 20 μm is 5% by number or more, and
(7) in a portion of the carbon material with the sphericity of 0.7 or less and a particle size of 10 μm or less is 0.3% by number or less.

When the carbon material satisfies the above (6), a lithium ion secondary battery which is superior in input-output characteristics tends to be obtained.

When the carbon material satisfies the above (7), a lithium ion secondary battery which is superior in input-output characteristics, high temperature storage characteristics, and life properties such as cycling characteristics tends to be obtained.

Third Embodiment

An anode material for a lithium ion secondary battery of the third embodiment of the invention includes a carbon material satisfying the following (1), (2) and (5):
(1) the average particle size (D50) is 22 μm or less,
(2) the D90/D10 of particle sizes is 2.2 or less, and
(5) in a case in which the carbon material is stirred in purified water containing a surfactant, and then irradiated with ultrasonic waves for 15 minutes with an ultrasonic cleaner, a ratio of D10 after the ultrasonic irradiation to D10 (the same as the particle size (D10) of a carbon material in (2) above) before the ultrasonic irradiation (D10 after ultrasonic irradiation/D10 before ultrasonic irradiation) is 0.90 or more.

When an anode material for a lithium ion secondary battery satisfies the above (1), (2), and (5), a lithium ion secondary battery superior in input-output characteristics and cycling characteristics becomes producible.

More specifically, when the above (1) is satisfied, a lithium ion secondary battery, which is excellent in high temperature storage characteristics, tends to become producible.

When the above (2) and (5) are satisfied, aggregation of carbon material particles is further suppressed, so that the sphericity of the carbon material becomes higher, and the tap density of the carbon material tends to be enhanced. Owing to the enhancement of the tap density of the carbon material, the electrode density becomes higher, when the anode material for a lithium ion secondary battery is applied to a current collector. Consequently, a press pressure necessary for obtaining the target electrode density of the anode for a lithium ion secondary battery tends to be reducible. When the press pressure is reduced, the lateral orientation of a carbon material is decreased, and intake and discharge of a lithium ion at the time of charge and discharge becomes easier, so that a lithium ion secondary battery further superior in input-output characteristics tends to become producible.

Since a carbon material repeats expansion and contraction in a lithium ion secondary battery due to charge and discharge, in a case where the adherence between a carbon material and a current collector is low, there is a risk that the carbon material may be detached from the current collector to reduce the discharge capacity and to decrease the cycling characteristics. In contrast, in the case of an anode material for a lithium ion secondary battery of the present embodiment, since the tap density of a carbon material is enhanced, the adherence between the carbon material, which is a anode active material, and a current collector tends to be enhanced. Therefore, by using an anode material for a lithium ion secondary battery of the present embodiment, even when the carbon material repeats expansion and contraction due to charge and discharge, the adherence between a carbon material and a current collector can be maintained, so that a lithium ion secondary battery superior in cycling characteristics tends to become producible.

Furthermore, since the adherence between a carbon material and a current collector is high in an anode material for a lithium ion secondary battery, the amount of a binder needed for producing an anode can be reduced, so that a lithium ion secondary battery superior in energy density tends to be produced at a low cost.

It is preferable that a carbon material satisfies at least one of the following (3) or (4) in addition to the above (1), (2), and (5):
(3) the linseed oil absorption amount is 50 mL/100 g or less, and
(4) the tap density is 1.00 g/cm$^3$ or more.

When a carbon material satisfies at least one of the above (3) and (4), a lithium ion secondary battery superior in input-output characteristics and cycling characteristics can be produced.

It is preferable that a carbon material satisfies at least one of the following (6) or (7) in addition to the above (1), (2), and (5), and more preferable that it satisfies the following (6) and (7):
(6) in a portion of the carbon material with a sphericity of from 0.6 to 0.8 and a particle size of from 10 μm to 20 μm is 5% by number or more, and
(7) in a portion of the carbon material with the sphericity of 0.7 or less and a particle size of 10 μm or less is 0.3% by number or less.

When the carbon material satisfies the above (6) a lithium ion secondary battery which is superior in input-output characteristics tends to be obtained.

When the carbon material satisfies the above (7), a lithium ion secondary battery which is superior in input-output characteristics, high temperature storage characteristics, and life properties such as cycling characteristics tends to be obtained.

There is no particular restriction on the method of producing an anode material of the present disclosure. From the viewpoint of efficiently producing an anode material satisfying the above requirements, when a carbon material is produced using the first carbon material and a precursor of the second carbon material, it is preferable that the same is produced according to the following method of producing an anode material.

<Method of Producing Anode Material for Lithium Ion Secondary Battery>

A method of producing an anode material for a lithium ion secondary battery in an embodiment of the invention includes a step of producing a carbon material by heat-treating a mixture containing the first carbon material that becomes a core of the carbon material and a precursor of the second carbon material having a crystallinity lower than the first carbon material.

According to the above-described method, the aforedescribed anode material can be produced efficiently.

With respect to the above method, detailed or preferable modes of the first carbon material, a precursor of the second carbon material, and a carbon material are the same as those described in the section of the anode material for a lithium ion secondary battery.

The heat treatment temperature for the mixture is preferably from 950° C. to 1,500° C. from the viewpoint of improving the input-output characteristics of a lithium ion secondary battery, more preferably from 1,000° C. to 1,300°

C., and further preferably from 1,050° C. to 1,250° C. The temperature at the time of a heat treatment of the mixture, may be constant throughout the heat treatment, or may be changed.

In the above method, there is no particular restriction on the content ratios of the first carbon material and a precursor of the second carbon material in a mixture before the heat treatment. From the viewpoint of improving input-output characteristics of a lithium ion secondary battery, the content ratio of the first carbon material is preferably from 85% by mass to 99.9% by mass, more preferably from 90% by mass to 99% by mass, and further preferably from 95% by mass to 99% by mass with respect to the total mass of the mixture. Meanwhile, the content ratio of the precursor of the second carbon material is preferably from 0.1% by mass to 15% by mass, more preferably from 1% by mass to 10% by mass, and further preferably from 1% by mass to 5% by mass with respect to the total mass of the mixture from the viewpoint of improving the input-output characteristics of a lithium ion secondary battery.

<Anode for Lithium Ion Secondary Battery>

The anode for a lithium ion secondary battery of the present disclosure includes an anode material layer including the aforedescribed anode material for a lithium ion secondary battery of the present disclosure and a current collector. The anode for a lithium ion secondary battery may include optionally another component in addition to the anode material layer containing an anode material and the current collector described above.

An anode for a lithium ion secondary battery may be produced, for example, by kneading an anode material and a binder together with a solvent to prepare an anode material composition in a slurry form, and coating the same on to a current collector to form an anode material layer; or shaping the anode material composition into a sheet form, a pellet form, or the like, and uniting the same with a current collector. Kneading can be carried out using a dispersing device, such as a stirrer, a ball mill, a super sand mill, and a pressurized kneader.

There is no particular restriction on the binder used for preparation of a anode material composition. Examples of the binder include a styrene-butadiene copolymer, a polymer of an ethylenic unsaturated carboxylic acid ester, such as methyl acrylate, methyl methacrylate, ethyl acrylate, ethyl methacrylate, butyl acrylate, butyl methacrylate, acrylonitrile, methacrylonitrile, hydroxyethyl acrylate, and hydroxyethyl methacrylate, a polymer of an ethylenic unsaturated carboxylic acid, such as acrylic acid, methacrylic acid, itaconic acid, fumaric acid and maleic acid, poly(vinylidene fluoride), and a polymer compound with high ionic conductivity, such as poly(ethylene oxide), polyepichlorohydrin, polyphosphazene, and polyacrylonitrile. When an anode material composition contains a binder, its amount is not particularly restricted. The content of a binder may be, for example, from 0.5 parts by mass to 20 parts by mass with respect to 100 parts by mass of a total of the anode material and the binder.

There is no particular restriction on a solvent, insofar as it can dissolve or disperse the binder. Specific examples include an organic solvent, such as N-methyl-2-pyrrolidone, N,N-dimethylacetamide, N,N-dimethylformamide, and γ-butyrolactone. There is no particular restriction on the amount of the solvent, insofar as the anode material composition can be made to have a desired form such as a paste. The amount of the solvent is preferably, for example, 60 parts by mass or more and less than 150 parts by mass with respect to 100 parts by mass of the anode material.

An anode material composition may contain a thickener. Examples of a thickener include carboxymethylcellulose and a salt thereof, methylcellulose, hydroxymethylcellulose, hydroxyethyl cellulose, ethylcellulose, poly(vinyl alcohol), poly(acrylic acid) and a salt thereof, alginic acid and a salt thereof, oxidized starch, phosphorylated starch, and casein. When an anode material composition contains a thickener, its amount is not particularly restricted. The content of the thickener may be, for example, from 0.1 parts by mass to 5 parts by mass with respect to 100 parts by mass of the anode material.

An anode material composition may contain an electroconductive aid. Examples of an electroconductive aid include a carbon material, such as natural graphite, artificial graphite, carbon black (acetylene black, thermal black, furnace black, etc.), an oxide to exhibit electroconductivity, and a nitride to exhibit electroconductivity. When an anode material composition contains an electroconductive aid, its amount is not particularly restricted. The content of the electroconductive aid may be, for example, from 0.5 parts by mass to 15 parts by mass with respect to 100 parts by mass of the anode material.

There is no particular restriction on the material of a current collector, and it may be selected from aluminum, copper, nickel, titanium, stainless steel, etc. There is no particular restriction on the form of a current collector, and it may be selected from foil, perforated foil, mesh, etc. Additionally, a porous material, such as porous metal (metal foam), and carbon paper, may be used as a current collector.

When an anode material composition is applied to a current collector to form an anode material layer, the method therefor is not particularly restricted, and a publicly known method, such as a metal mask printing method, an electrostatic coating method, a dip coating method, a spray coating method, a roll coating method, a doctor blade method, a comma coating method, a gravure coating method, and a screen printing method, may be employed. After an anode material composition is applied to a current collector, the solvent contained in the anode material composition is removed by drying. Drying may be performed, for example, using a hot air dryer, an infrared dryer, or a combination of these devices. Flatting may be performed as needed. The flatting may be performed using a method such as a flat press or a calendar roll.

When an anode material layer is formed by integrating an anode material composition shaped into a sheet form, a pellet form, or the like, with a current collector, the method for integration is not particularly restricted. For example, it can be performed with a roller, a flat press, or a combination of these means. The pressure at the time of integration is preferably, for example, from 1 MPa to 200 MPa.

<Lithium Ion Secondary Battery>

The lithium ion secondary battery of the present disclosure includes the aforedescribed anode for a lithium ion secondary battery of the present disclosure (hereinafter also simply referred to as "anode"), a cathode, and an electrolytic solution.

The cathode can be obtained by forming a cathode material layer on a current collector in the same manner as the aforedescribed method of producing the anode. As the current collector, a metal or an alloy, such as aluminum, titanium, and stainless steel, in the form of a foil, a perforated foil, a mesh, or the like may be used.

There is no particular restriction on a cathode material used for forming a cathode material layer. Examples thereof include a metallic compound that can be doped or intercalated with a lithium ion (a metal oxide, a metal sulfide, etc.), and an electroconductive polymer material. More specific examples include lithium cobaltite ($LiCoO_2$), lithium nickelate ($LiNiO_2$), lithium manganate ($LiMnO_2$), a complex oxide thereof ($LiCo_xNi_yMn_zO_2$, x+y+z=1), a complex oxide containing an additive element M' ($LiCo_aNi_bMn_cM'_dO_2$, a+b+c+d=1, M': Al, Mg, Ti, Zr, or Ge), a spinel type lithium manganese oxide ($LiMn_2O_4$), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, a lithium-containing compound, such as an olivine type $LiMPO_4$ (M: Co, Ni, Mn, and Fe), an electroconductive polymer, such as polyacetylene, polyaniline, polypyrrole, polythiophene, and polyacene, and porous carbon. The cathode materials may be used singly, or in combination of two or more kinds thereof.

There is no particular restriction on an electrolytic solution, and for example a lithium salt as an electrolytic dissolved in a nonaqueous solvent (so-called organic electrolytic solution) may be used.

Examples of the lithium salts include $LiClO_4$, $LiPF_6$, $LiAsF_6$, $LiBF_4$, and $LiSO_3CF_3$. The lithium salts may be used singly, or in combination of two or more kinds thereof.

Examples of the nonaqueous solvent include ethylene carbonate, fluoroethylene carbonate, chloroethylene carbonate, propylene carbonate, butylene carbonate, vinylene carbonate, cyclopentanone, cyclohexylbenzene, sulfolane, propane sultone, 3-methyl sulfolane, 2,4-dimethyl sulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, ethyl acetate, trimethyl phosphate, and triethyl phosphate. The nonaqueous solvents may be used singly, or in combination of two or more kinds thereof.

There is no particular restriction on the form of a cathode and an anode of a lithium ion secondary battery. For example, it may be in a state in which a cathode and an anode, optionally as well as a separator placed between the cathode and the anode are wound up into a spiral form, or they are layered in a flat sheet form.

There is no particular restriction on the separator, and, for example, non-woven fabric, a cloth, a microporous film made from a resin, or a combination thereof may be used. Examples of a resin include one containing as a main component a polyolefin, such as polyethylene, and polypropylene. When the cathode and the anode are not in direct contact with each other owing to the structure of a lithium ion secondary battery, it is not necessary to use a separator.

There is no particular restriction on the shape of a lithium ion secondary battery. Examples thereof include a layered battery, a paper battery, a button battery, a coin battery, a layer-built battery, a cylindrical battery, and a square battery.

Since the lithium ion secondary battery of the present disclosure is superior in output characteristics, it is suitable for a large capacity lithium ion secondary battery to be used for an electric vehicle, a power tool, an electric power storage device, etc. In particular, it is suitable for a lithium ion secondary battery to be used for an electric vehicle (EV), a hybrid electric vehicle (HEV), a plug-in hybrid electric vehicle (PHEV), etc. for which charge and discharge at a large current is required to improve acceleration performance, and braking regeneration performance.

EXAMPLES

The invention will be specifically described below by way of the following test results, provided that the invention be not limited to these test results.

[Test 1]
(Production of Anode Material)

One hundred (100) parts by mass of spherical natural graphite ($d_{002}$=0.336 nm) with an average particle size of 10 μm, and 1 part by mass of coal tar pitch (softening point 90° C., residual carbon ratio (carbonization rate) 50%) were mixed. Then, its temperature was raised in a nitrogen stream at a rate of temperature increase of 20° C./hour up to 1100° C., maintained at 1100° C. (baking treatment temperature) for 1 hour to form graphite particles coated with a carbon layer (carbon material). The formed graphite particles coated with a carbon layer were crushed by a cutter mill, and then sieved with a 350 mesh sieve, and the undersize was used as an anode material for this test. On the obtained anode material, a measurement of average interplanar spacing $d_{002}$, a measurement of R value, a measurement of $N_2$ specific surface area, a measurement of average particle size (50% D), a measurement of D90/D10, a measurement of tap density, and a measurement of D10 after ultrasonic irradiation/D10 before ultrasonic irradiation were performed according to the following methods.

The respective physical property values are shown in Table 2. The carbon coating amount (%) in Table 2 refers to the ratio (% by mass) of the used coal tar pitch with respect to spherical natural graphite.

[Measurement of Average Interplanar Spacing $D_{002}$]

A measurement of an average interplanar spacing $d_{002}$ was performed by the X-ray diffraction method. Specifically, an anode material sample was placed in a recessed part of a sample holder made of quartz, and set on a measurement stage, and a measurement was carried out using a wide angle x-ray diffraction device (manufactured by Rigaku Corporation) under the following measurement conditions. The results are shown in Table 2.

Radiation source: CuKα line (wavelength=0.15418 nm)
Output: 40 kV, 20 mA
Sampling width: 0.010°
Scanning range: from 10° to 35°
Scanning speed: 0.5°/min

[Measurement of R Value]

For an R value, Raman spectrometry was carried out under the following conditions, and in the obtained Raman spectrum an intensity ratio (Id/Ig) of the intensity Id of the maximum peak near 1360 $cm^{-1}$ to the intensity Ig of the maximum peak near 1580 $cm^{-1}$ was regarded as the R value.

The Raman spectrometry was carried out using a laser Raman spectrophotometer (Model number: NRS-1000, manufactured by JASCO Corporation), by irradiating a sample plate of an anode material sample set flatwise with argon laser light. The measurement conditions are as follows. The results are shown in Table 2.

Wavelength of argon laser light: 532 nm
Wavenumber resolution: 2.56 $cm^{-1}$
Measurement range: from 1180 $cm^{-1}$ to 1730 $cm^{-1}$
Peak research: background removal

[Measurement of $N_2$ Specific Surface Area]

A $N_2$ specific surface area was computed by the BET method based on a measurement of nitrogen adsorption by the single-point method using a fast specific surface area and pore size distribution analyzer (FLOWSORB III, manufactured by Shimadzu Corporation) at the liquid nitrogen temperature (77 K). The results are shown in Table 2.

[Measurement of $CO_2$ Adsorption Amount]

A $CO_2$ absorption amount was measured using BELSORP II manufactured by MicrotracBEL Corp. Also, a measurement was carried out using BELPREP II manufactured by MicrotracBEL Corp. as a pretreatment device. As the $CO_2$ adsorption amount, a value at a measurement temperature of 273 K and a relative pressure $P/P_0$=0.98 to 0.99 (P=equilibrium pressure, $P_0$=saturated vapor pressure) was used. In performing the pretreatment, at a degree of vacuum of 1 Pa or less, the temperature was raised to 250° C. at 5° C./min, held there for 10 min, then raised further to 350° C. at 3° C./min, and held there for 210 min. Thereafter, heating was discontinued and the sample was cooled down to room temperature. The measurement relative pressure for measuring an adsorption amount was implemented as shown in the following Table 1. The results are shown in Table 2.

The $CO_2$ adsorption amount of an alumina powder (BCR-171, No 0446, produced by Institute for Reference Materials and Measurements) as the standard substance was measured by the above method, and found to be 0.40 $cm^3/g$.

TABLE 1

| STEP | Target relative pressure |
|---|---|
| 1 | 0.001 |
| 2 | 0.005 |
| 3 | 0.010 |
| 4 | 0.020 |
| 5 | 0.030 |
| 6 | 0.040 |
| 7 | 0.050 |
| 8 | 0.075 |
| 9 | 0.100 |
| 10 | 0.125 |
| 11 | 0.150 |
| 12 | 0.175 |
| 13 | 0.200 |
| 14 | 0.225 |
| 15 | 0.250 |
| 16 | 0.275 |
| 17 | 0.300 |
| 18 | 0.350 |
| 19 | 0.400 |
| 20 | 0.450 |
| 21 | 0.500 |
| 22 | 0.550 |
| 23 | 0.600 |
| 24 | 0.650 |
| 25 | 0.700 |
| 26 | 0.750 |
| 27 | 0.800 |
| 28 | 0.825 |
| 29 | 0.850 |
| 30 | 0.875 |
| 31 | 0.900 |
| 32 | 0.925 |
| 33 | 0.950 |
| 34 | 0.975 |
| 35 | 0.990 |

[$CO_2$ Adsorption Amount Per Unit Area ($CO_2$ Adsorption Amount/$N_2$ Specific Surface Area)]

With respect to an anode material sample, the $CO_2$ adsorption amount per unit area was calculated by the method described above. The results are shown in Table 2.

[Measurement of Average Particle Size (50% D) and Measurement of D90/D10]

A solution, in which an anode material sample was dispersed in purified water together with a surfactant (Trade name: LIPONOL T/15, produced by Lion Corporation) at a mass ratio of 0.2%, was placed in a sample water tank of a laser diffraction particle size distribution analyzer (SALD-3000J, manufactured by Shimadzu Corporation). Next, the solution was circulated with a pump while applying ultrasonic waves thereto (the pump flow rate was 65% of the maximum value), and the amount of water was adjusted so that the absorbance became in a range of from 0.10 to 0.15, and the particle size (D50) at the cumulative percentage of 50% of the obtained particle size distribution was defined as the average particle size. Further, the D90/D10 was determined from the particle size (D10) at the cumulative percentage of 10% of the obtained particle size distribution, and the particle size (D90) at the cumulative percentage of 90% of the obtained particle size distribution. The results are shown in Table 2.

[Measurement of Tap Density]

One hundred (100) $cm^3$ of the sample powder was charged in a 150 $cm^3$-volume graduated flat bottom test tube (KRS-406, manufactured by Kuramochi Scientific Instruments Seisakusho), and the graduated flat bottom test tube was closed with a stopper. The graduated flat bottom test tube was dropped 250 times from a height of 5 cm, and thereafter a value obtained from the weight and volume of the sample powder was defined as the tap density. The results are shown in Table 2.

[Measurement of D10 After Ultrasonic Irradiation/D10 Before Ultrasonic Irradiation]

With respect to an anode material sample, the ratio of D10 after ultrasonic irradiation to D10 before ultrasonic irradiation (D10 after ultrasonic irradiation/D10 before ultrasonic irradiation) was determined by the aforedescribed method.

[Linseed Oil Absorption Amount (Oil Absorption Amount)]

With respect to an anode material sample, the linseed oil absorption amount was measured by the method described above. The results are shown in Table 2.

[Tests 2 to 11]

Each anode material was produced in the same manner as in Test 1 except that the carbon coating amount in Test 1 was changed to the value shown in Table 2, and spherical natural graphite to be used as a raw material was changed appropriately such that the measured values of the average particle size (D50) and the D90/D10 became the value shown in Table 2. With respect to the produced anode material, the respective physical properties were measured similarly as in Test 1.

The respective physical properties are shown in Table 2.

[Tests 12 to 17]

Each anode material was produced in the same manner as in Test 1 except that the carbon coating amount in Test 1 was changed to the value shown in Table 2, and spherical natural graphite to be used as a raw material was changed appropriately such that the average particle size (D50) and the D90/D10 became the value shown in Table 2. With respect to the produced anode material, the respective physical properties were measured similarly as in Test 1.

The respective physical properties are shown in Table 2.

TABLE 2

| | Average particle size (μm) | Specific surface area (m²/g) | $d_{002}$ (nm) | R value | D90/D10 | Tap density (g/cm³) | Oil absorption amount (mL/100 g) | D10 after stirring/D10 before stirring | Proportion of sphericity 0.6 to 0.8, and particle size 10 to 20 μm (%) | Proportion of sphericity ≤0.7 and particle size ≤10 μm (%) | Carbon coating amount (%) | $CO_2$ adsorption amount (cm³/g) | $CO_2$ adsorption amount/ $N_2$ specific surface area (cm³/m²) |
|---|---|---|---|---|---|---|---|---|---|---|---|---|---|
| Test 1 | 10.0 | 7.2 | 0.3355 | 0.30 | 1.6 | 1.09 | 44.5 | 0.97 | 9.0 | 0.20 | 1 | 0.36 | 0.05 |
| Test 2 | 10.2 | 5.2 | 0.3355 | 0.38 | 1.8 | 1.10 | 44.7 | 0.96 | 9.2 | 0.19 | 3 | 0.26 | 0.05 |
| Test 3 | 10.4 | 3.7 | 0.3355 | 0.40 | 1.7 | 1.11 | 43.5 | 0.98 | 9.4 | 0.17 | 5 | 0.15 | 0.04 |
| Test 4 | 12.7 | 4.1 | 0.3355 | 0.50 | 2.0 | 1.08 | 44.8 | 0.96 | 10.1 | 0.21 | 3 | 0.21 | 0.05 |
| Test 5 | 13.3 | 3.0 | 0.3355 | 0.45 | 1.9 | 1.04 | 45.1 | 0.96 | 10.3 | 0.23 | 5 | 0.21 | 0.07 |
| Test 6 | 15.9 | 3.2 | 0.3355 | 0.41 | 2.0 | 1.05 | 47.5 | 0.97 | 10.6 | 0.25 | 3 | 0.16 | 0.05 |
| Test 7 | 16.2 | 2.4 | 0.3355 | 0.48 | 1.8 | 1.03 | 45.8 | 0.98 | 10.4 | 0.24 | 5 | 0.14 | 0.06 |
| Test 8 | 18.6 | 2.7 | 0.3355 | 0.43 | 2.0 | 1.08 | 44.5 | 0.98 | 6.1 | 0.25 | 3 | 0.14 | 0.05 |
| Test 9 | 18.8 | 2.0 | 0.3355 | 0.45 | 2.1 | 1.12 | 42.6 | 0.98 | 6.0 | 0.23 | 5 | 0.12 | 0.06 |
| Test 10 | 21.9 | 2.3 | 0.3355 | 0.40 | 2.1 | 1.11 | 37.6 | 0.98 | 0.6 | 0.28 | 3 | 0.12 | 0.05 |
| Test 11 | 21.7 | 1.5 | 0.3355 | 0.49 | 2.1 | 1.12 | 37.0 | 0.98 | 0.9 | 0.29 | 5 | 0.11 | 0.07 |
| Test 12 | 10.6 | 4.2 | 0.3355 | 0.51 | 2.4 | 0.99 | 54.1 | 0.75 | 16.0 | 0.33 | 3 | 0.17 | 0.04 |
| Test 13 | 12.2 | 3.8 | 0.3355 | 0.44 | 2.3 | 0.98 | 53.8 | 0.72 | 4.5 | 0.26 | 3 | 0.27 | 0.07 |
| Test 14 | 15.8 | 3.3 | 0.3355 | 0.32 | 2.3 | 0.99 | 51.2 | 0.88 | 3.0 | 0.31 | 3 | 0.17 | 0.05 |
| Test 15 | 16.2 | 2.1 | 0.3355 | 0.41 | 2.3 | 1.00 | 52.0 | 0.89 | 3.9 | 0.38 | 5 | 0.13 | 0.06 |
| Test 16 | 18.7 | 2.3 | 0.3355 | 0.42 | 2.4 | 0.98 | 53.1 | 0.85 | 2.5 | 0.21 | 5 | 0.12 | 0.05 |
| Test 17 | 21.8 | 1.4 | 0.3355 | 0.35 | 2.3 | 1.00 | 52.0 | 0.82 | 0.3 | 0.23 | 3 | 0.08 | 0.06 |

(Production of Lithium Ion Secondary Battery for Evaluating Input-Output Characteristics)

Using an anode material produced in each Test, a lithium ion secondary battery for evaluating the input-output characteristics was prepared according to the following procedure.

First, an aqueous solution (CMC concentration: 2% by mass) of CMC (carboxymethylcellulose, product number 2200, produced by Daicel FineChem Ltd.) was added as a thickener to 98 parts by mass of the anode material such that the solid content of CMC reached 1 part by mass, and the mixture was kneaded for 10 min. Next, purified water was added such that the total solid concentration of the anode material and CMC became from 40% by mass to 50% by mass, and kneading was performed for 10 min. Subsequently, an aqueous dispersion (SBR concentration: 40% by mass) of SBR (BM400-B, Zeon Corporation), which was a styrene butadiene copolymer rubber, was added as a binder, such that the solid content of SBR reached 1 part by mass, and mixing was performed for 10 min to prepare a paste-like anode material composition. Next, the anode material composition was coated on an 11 μm-thick electrolytic copper foil with a comma coater, in which the clearance was adjusted to the coating amount per unit area of 10.0 mg/cm², to prepare an anode material layer. Then the electrode density was adjusted to 1.3 g/cm³ with a hand press. The electrolytic copper foil on which the anode material layer was formed was punched out into a disk having a diameter of 14 mm to complete a sample electrode (anode).

The prepared sample electrode (anode), a separator, and a counter electrode (cathode) were put into a coin-battery container in this order, and then an electrolytic solution was added to complete a coin-type lithium ion secondary battery. As the electrolytic solution, a solution prepared by adding vinylene carbonate (VC) to a mixed solvent of ethylene carbonate (EC) and ethyl methyl carbonate (EMC) (volume ratio of EC to EMC is 3:7) in an amount of 0.5% by mass with respect to the total amount of the mixed solution to give a $LiPF_6$ concentration of 1 mol/L was used. As the counter electrode (cathode), metallic lithium was used. As the separator, a polyethylene microporous membrane having a thickness of 20 μm was used. Using the prepared lithium ion secondary battery, the initial charge and discharge characteristics and the output characteristics (initial DCR, and DCR after high temperature storage) were evaluated according to the following methods.

[Evaluation of Input-Output Characteristics]
(Evaluation of Initial Charge and Discharge Characteristics)

The produced lithium ion secondary battery was charged by performing constant current charging at a current value of 0.2 C to a voltage of 0 V (V vs. Li/Li⁺), and then by performing constant voltage charging at a voltage of 0 V until the current value reached 0.02 C. The capacity at this time was defined as the initial charge capacity.

Next, after a pause of 30 min, constant current discharging was performed at a current value of 0.2 C to a voltage of 1.5 V (V vs. Li/Li⁺). The capacity at this time was defined as the initial discharge capacity.

Further, the irreversible capacity was determined by subtracting the value of the initial discharge capacity from the value of the initial charge capacity.

Each physical property value is shown in Table 3.

In this regard, "C" used as a unit of current value means "current value (A)/battery capacity (Ah)".

The output density of this lithium ion secondary battery was determined by measuring the direct current resistance (DCR) of the battery. More particulars are as follows.

Figure 4:
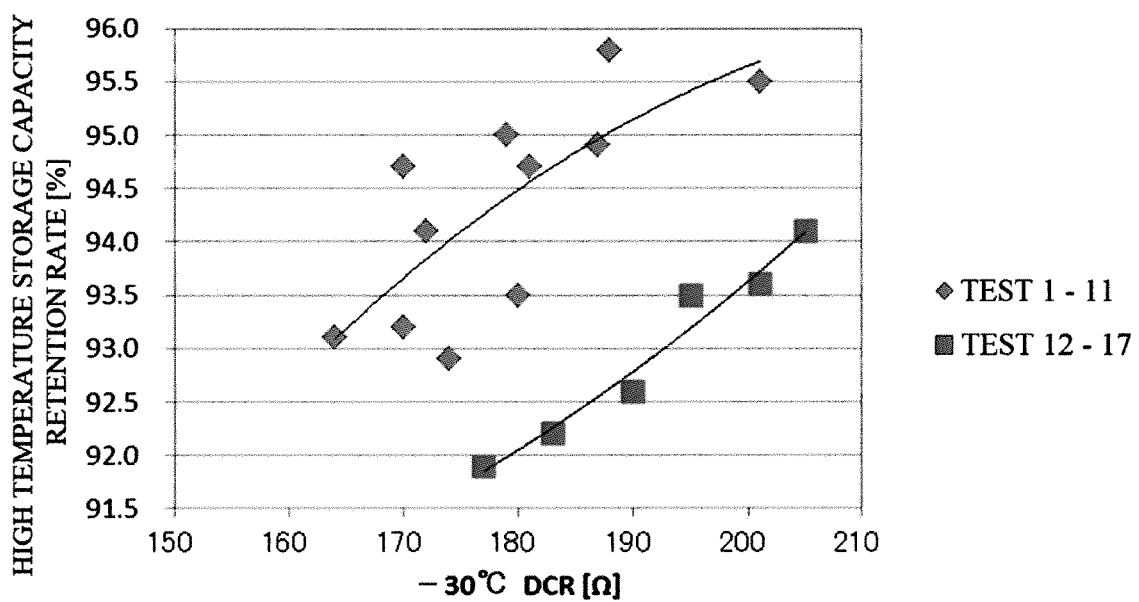
FIG. 4 is a graph showing the relationships between the output characteristics and the high-temperature storage capacity retention rate in Tests 1 to 11 and Tests 12 to 17.

Each physical property value is shown in Table 3 and FIG. 4.

(Measurement of Initial DCR at 25° C.)

The above lithium ion secondary battery was put into a constant temperature chamber set at 25° C., and a cycle of charge and discharge was performed under the conditions of charge: CC/CV 0.2 C 0 V, 0.02 C cut, and discharge: CC 0.2 C, 1.5 V cut.

Next, constant current charging was performed at a current value of 0.2 C to SOC 50%.

In addition, the above lithium ion secondary battery was put into a constant temperature chamber set at 25° C., and constant current charging was performed under the respective conditions of 1 C, 3 C, and 5 C for 10 sec each, and the voltage drop (ΔV) at each constant current was measured, and a direct current resistance (DCR) was calculated according to the following Formula to obtain an initial DCR.

$$DCR\ [\Omega] = [(3\ C\ \text{voltage drop}\ \Delta V - 1\ C\ \text{voltage drop}\ \Delta V) + (5\ C\ \text{voltage drop}\ \Delta V - 3\ C\ \text{voltage drop}\ \Delta V)]/4$$

(Measurement of Initial DCR at −30° C.)

The above lithium ion secondary battery was put into a constant temperature chamber set at 25° C., and a cycle of charge and discharge was performed under the conditions of charge: CC/CV 0.2 C 0 V, 0.02 C cut, and discharge: CC 0.2 C, 1.5 V cut.

Next, constant current charging was performed at a current value of 0.2 C to SOC 50%.

In addition, the above lithium ion secondary battery was put into a constant temperature chamber set at −30° C., and constant current charging was performed under the respective conditions of 0.1 C, 0.3 C, and 0.5 C for 10 sec each, and the voltage drop (ΔV) at each constant current was measured, and a direct current resistance (DCR) was calculated according to the following Formula to obtain an initial DCR.

$$DCR\ [\Omega] = [(0.3\ C\ \text{voltage drop}\ \Delta V - 0.1C\ \text{voltage drop}\ \Delta V) + (0.5\ C\ \text{voltage drop}\ \Delta V - 0.3C\ \text{voltage drop}\ \Delta V)]/0.4$$

[Evaluation of High Temperature Storage Retention Rate and High Temperature Storage Recovery Rate]

The produced lithium ion secondary battery was put into a constant temperature chamber set at 25° C., and constant current charging was performed at a current value of 0.2 C to a voltage of 0 V (V vs. Li/Li$^+$), and then constant voltage charging was performed at 0 V until the current value reached 0.02 C. Next, after a pause of 30 min, constant current discharging was performed at a current value of 0.2 C to a voltage of 1.5 V (V vs. Li/Li$^+$). This charge and discharge was repeated twice, then constant current charging was performed at a current value of 0.2 C to a voltage of 0 V (V vs. Li/Li$^+$), and then constant voltage charging was performed at a voltage of 0 V until the current value reached 0.02 C. The battery was placed in a constant temperature chamber set at 60° C., and stored for 5 days.

Thereafter, it was placed in a constant temperature chamber set at 25° C., left standing for 60 min, and constant current discharging was performed at a current value of 0.2 C to a voltage of 1.5 V (V vs. Li/Li$^+$). Then, charge and discharge was repeated once under the above conditions.

The high temperature storage retention rate and the high temperature storage recovery rate were calculated from the following Formulas.

High temperature storage retention rate (%)=(first discharge capacity at 25° C. after storage at 60° C. for 5 days)/(second discharge capacity at 25° C.)×100

High temperature storage recovery rate (%)=(second discharge capacity at 25° C. after storage at 60° C. for 5 days)/(second discharge capacity at 25° C.)×100

The relationship between the average particle size (D50) of a carbon material contained in an anode material and the output characteristics is shown in FIG. 1. FIG. 1 shows the output characteristic (initial DCR (Ω) at −30° C.) of a lithium ion secondary battery in Tests 2 to 11. As shown in FIG. 1, when the average particle size is 17 μm or less, the output characteristic is superior, and in the case of the carbon coating amount of 3%, the output characteristic tends to be better.

Figure 2:
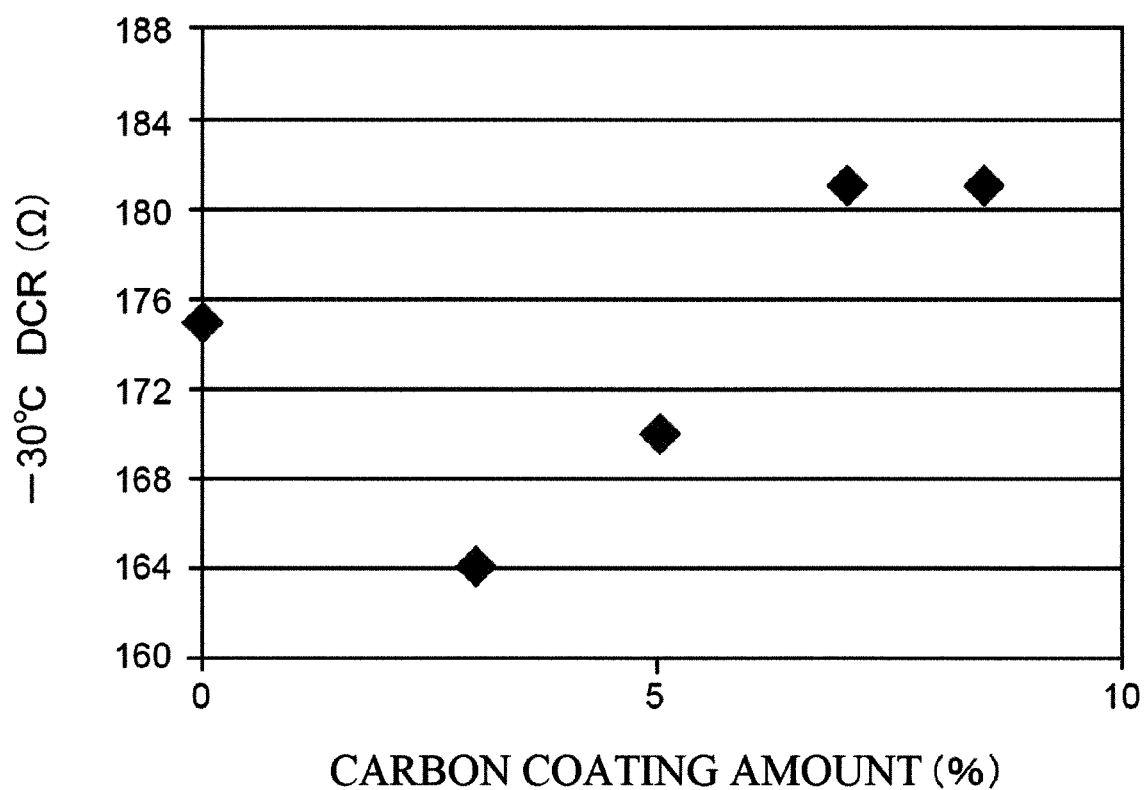
FIG. 2 is a graph showing the relationship between the carbon coating amount of a carbon material and the output characteristic in each test.

Next, in a case where spherical natural graphite with an average particle size of 10 μm was used, the relationship between the carbon coating amount and the output characteristics is shown in FIG. 2. FIG. 2 shows the output characteristic (initial DCR (Ω) at −30° C.) of a lithium ion secondary battery. As shown in FIG. 2, the output characteristic tends to be excellent, when the carbon coating amount is near 3%.

TABLE 3

| | Initial charge capacity (mAh/g) | Initial discharge capacity (mAh/g) | Irreversible capacity (mAh/g) | DCR (Ω) 25° C. | DCR (Ω) −30° C. | High temperature storage at 60° C. for 5 days — High temperature storage retention rate (%) | High temperature storage at 60° C. for 5 days — High temperature storage recovery rate (%) |
|---|---|---|---|---|---|---|---|
| Test 1 | 388 | 357 | 31 | 8.3 | 174 | 92.9 | 99.8 |
| Test 2 | 387 | 360 | 27 | 8.2 | 164 | 93.1 | 99.6 |
| Test 3 | 387 | 361 | 26 | 8.5 | 170 | 93.2 | 96.7 |
| Test 4 | 396 | 364 | 32 | 8.3 | 172 | 94.1 | 98.9 |
| Test 5 | 380 | 358 | 22 | 9 | 180 | 93.5 | 96.4 |
| Test 6 | 378 | 360 | 18 | 8.4 | 170 | 94.7 | 99.1 |
| Test 7 | 371 | 356 | 15 | 9.2 | 181 | 94.7 | 97.6 |
| Test 8 | 381 | 364 | 17 | 8.9 | 179 | 95 | 98.6 |
| Test 9 | 379 | 362 | 17 | 9.8 | 187 | 94.9 | 97.5 |
| Test 10 | 378 | 361 | 17 | 9.8 | 188 | 95.8 | 98.7 |
| Test 11 | 375 | 358 | 17 | 10.1 | 201 | 95.5 | 98.3 |
| Test 12 | 380 | 358 | 22 | 8.7 | 177 | 91.9 | 93.3 |
| Test 13 | 380 | 360 | 20 | 9.6 | 183 | 92.2 | 93.6 |
| Test 14 | 391 | 361 | 30 | 9.8 | 190 | 92.6 | 93.7 |
| Test 15 | 387 | 360 | 27 | 9.9 | 195 | 93.5 | 94.5 |
| Test 16 | 388 | 360 | 28 | 10.2 | 201 | 93.6 | 95.0 |
| Test 17 | 387 | 362 | 25 | 10.3 | 205 | 94.1 | 95.2 |

As shown in Table 3 and FIG. 4, in Tests 1 to 11, there is a tendency that the output characteristics and the high temperature storage characteristics are superior to Tests 12 to 17. In particular, when Tests 1 to 11 are compared with Tests 12 to 17 having equivalent average particle sizes, there is a tendency that the output characteristics and the high temperature storage characteristics of Tests 1 to 11 are superior. Further, among Tests 1 to 11, Tests 1 to 9 which satisfied the above (6) and (7) tend to be superior in output characteristics even to Tests 10 and 11.

(Production of Lithium Ion Secondary Battery for Evaluating Cycling Characteristics)

Using the anode materials prepared in Tests 2 and 12, lithium ion secondary batteries for evaluating cycling characteristics were prepared respectively according to the following procedure.

First, an aqueous solution (CMC concentration: 2% by mass) of CMC (carboxymethylcellulose, CELLOGEN WS-C, Dai-Ichi Kogyo Seiyaku Co., Ltd.) was added as a thickener to 98 parts by mass of the anode material such that the solid content of CMC reached 1 part by mass, and the mixture was kneaded for 10 min. Next, purified water was added such that the total solid concentration of the anode material and CMC became from 40% by mass to 50% by mass, and kneading was performed for 10 min. Subsequently, an aqueous dispersion of SBR (BM400-B, Zeon Corporation) was added as a binder (SBR concentration: 40% by mass), such that the solid content of SBR reached 1 part by mass, and mixing was performed for 10 min to prepare a paste-like anode material composition. Next, the anode material composition was coated on an 11 μm-thick electrolytic copper foil with a comma coater, in which the clearance was adjusted to the coating amount per unit area of 10.0 mg/cm$^2$, to prepare an anode material layer. Then the electrode density was adjusted to 1.3 g/cm$^3$ with a hand press. The electrolytic copper foil on which the anode material layer was formed was punched out to 2.5 cm×12 cm to complete a sample electrode (anode).

The prepared sample electrode (anode) was folded, into which a folded separator, a counter electrode (cathode) were placed in this order, and an electrolytic solution was injected to construct a lithium ion secondary battery. As the electrolytic solution, a solution prepared by adding vinylene carbonate (VC) to a mixed solvent of ethylene carbonate (EC) and ethyl methyl carbonate (EMC) (volume ratio of EC to EMC is 3:7) in an amount of 0.5% by mass with respect to the total amount of the mixed solution to give a LiPF$_6$ concentration of 1 mol/L was used. As the counter electrode (cathode), an electrode (1.5 cm×4 cm×2 cm) constituted with ternary (Ni, Co, Mn) lithium oxide/electroconductive material/PVDF (poly(vinylidene fluoride)) at a molar ratio of 90/5/5 was used. As the separator, a polyethylene microporous membrane having a thickness of 20 μm was used. Using the constructed lithium ion secondary battery, evaluation of cycling characteristics was performed according to the following method.

[Evaluation of Cycling Characteristics]

In Tests 2 and 12, using the lithium ion battery constructed as above, the cycling characteristics were evaluated as follows.

First, constant current charging was performed at 45° C. with a current value of 2 C and a charging final voltage of 4.2 V, and when the voltage reached 4.2 V constant voltage charging was performed at this voltage until the current value reached 0.02 C. After a pause of 30 min, constant current discharging was performed at 45° C. with a current value of 2 C to a final voltage of 2.7 V, and the discharge capacity was measured (discharge capacity of the first cycle). The above charge and discharge was repeated up to 300 cycles, and after 100 cycles, after 200 cycles, and after 300 cycles, the respective discharge capacities were measured. Then, the discharge capacity retention rate (%) was calculated from the following Formula.

Discharge capacity retention rate (%)=(Discharge capacity after 100 cycles, 200 cycles, or 300 cycles)/(Discharge capacity at 1st cycle)×100

Figure 3:
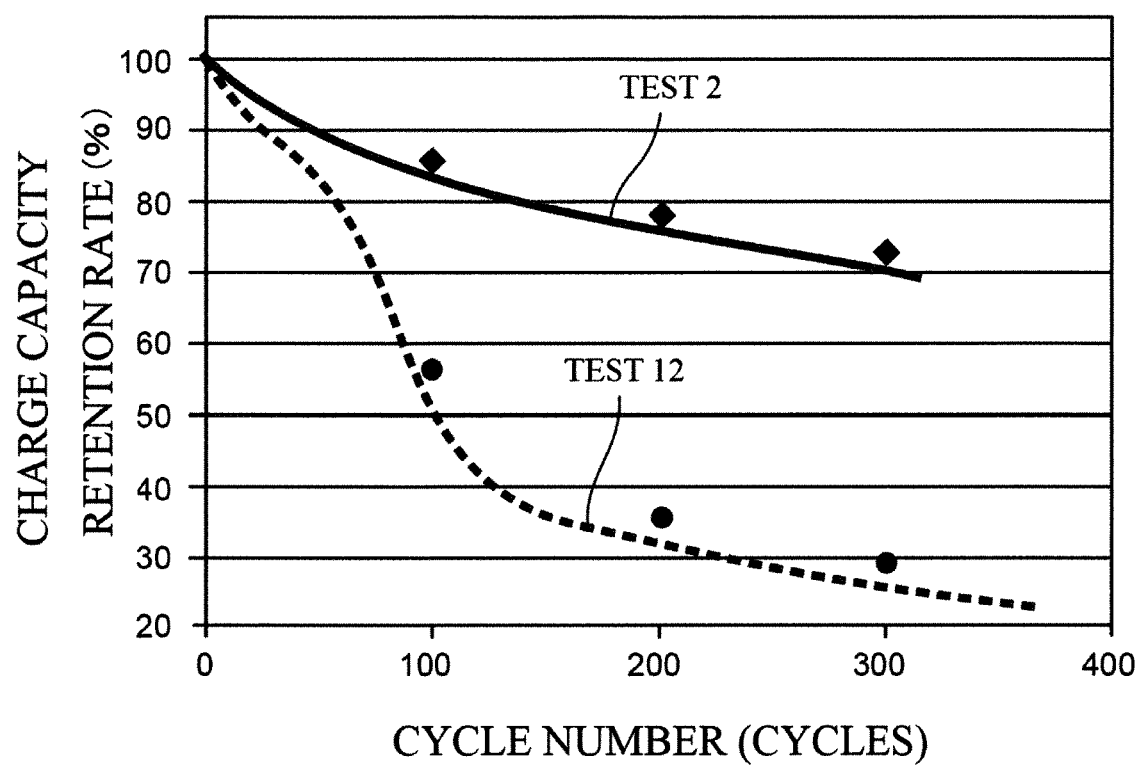
FIG. 3 is a graph showing the relationships between the cycle number and the discharge capacity retention rate in Tests 2 and 12.

The results are shown in FIG. 3. As seen in FIG. 3, the discharge capacity retention rate in Test 2 was higher than that in Test 12, and it was demonstrated that its cycling characteristics were excellent.

[Evaluation of Adherence]

An anode material composition is prepared using the anode material obtained in Test 2 or Test 12, and the anode material composition was applied to an electrolytic copper foil to form an anode material layer. Then the adherence between the electrolytic copper foil and the anode material layer was evaluated.

First, an anode material composition was prepared by the same method as described above using the anode material obtained in Test 2 or Test 12. Next, the anode material composition was coated on a 20 μm-thick electrolytic copper foil with a comma coater, in which the clearance was adjusted to the coating amount per unit area of 10.0 mg/cm$^2$, to prepare an anode material layer. Then the electrode density was adjusted to 1.3 g/cm$^3$ with a hand press. The electrolytic copper foil on which the anode material layer was formed was punched out to 2.5 cm×12 cm to yield an electrolytic copper foil with an anode material layer for evaluating the adherence.

(Evaluation of Peeling Property of Anode Material Layer)

Next, after sticking a double-faced adhesive tape G9000 produced by Dexerials Corporation to a stage movable in the lateral direction, the copper foil side of the copper foil with an anode material layer was bonded to the face of the double-faced adhesive tape opposite to the face stuck to the stage. Then, an adhesive tape (18 mm width) produced by 3M Company was bonded to the anode material layer side of the copper foil with an anode material layer such that the end of the adhesive tape was exposed, thereby completing a sample for evaluating the peeling property of an anode material layer.

With respect to the prepared sample for evaluating the peeling property of an anode material layer, the exposed end of the adhesive tape was grasped with a peel strength tester (push pull scale & digital force gauge, manufactured by Imada Co., Ltd.) to pull the end of the adhesive tape upward at a speed of 20 mm/min, while moving the stage laterally at a speed of 20 mm/min, such that the anode material layer bonded to the adhesive tape and the copper foil bonded to the double-faced adhesive tape were peeled off from each other. The then peel strength of the anode material layer was measured.

The results are shown in Table 4. The numerical values in Table 4 are relative values.

(Evaluation of Peeling Property of Copper Foil)

Next, after sticking a double-faced adhesive tape G9000 produced by Dexerials Corporation to a stage movable in the lateral direction, the anode material layer side of the copper foil with an anode material layer was bonded to the face of the double-faced adhesive tape opposite to the face stuck to the stage, thereby completing a sample for evaluating the peeling property of a copper foil. In this regard, in the sample for evaluating the peeling property of a copper foil, a copper foil with an anode material layer produced such that part of the copper foil was exposed from the end of the anode material layer was used.

With respect to the prepared sample for evaluating the peeling property of an anode material layer, the exposed end of the copper foil was grasped with a peel strength tester (push pull scale & digital force gauge, manufactured by Imada Co., Ltd.) to pull the end of the adhesive tape upward at a speed of 20 mm/min, while moving the stage laterally at a speed of 20 mm/min, such that the copper foil and the anode material layer bonded to the double-faced adhesive tape were peeled off from each other. The then peel strength of the copper foil was measured.

The results are shown in Table 4.

TABLE 4

|  | Test 2 | Test 12 |
|---|---|---|
| Peel strength of anode material layer [N/m] | 86 | 31 |
| Peel strength of copper foil [N/m] | 6 | 2 |

As seen in Table 4, it was demonstrated that the peel strength of the anode material layer and the peel strength of the copper foil in Test 2 were remarkably superior to those in Test 12

The entire contents of the disclosures by PCT/JP2017/017959 filed on 11 May 2017 are incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. An anode material for a lithium ion secondary battery, the anode material comprising a carbon material satisfying the following (1) to (3), (6), and (7):
   (1) an average particle size (D50) is 22 μm or less;
   (2) D90/D10 of particle sizes is 2.0 or less;
   (3) a linseed oil absorption amount is 50 mL/100 g or less;
   (6) a portion of the carbon material with a sphericity of from 0.6 to 0.8 and a particle size of from 10 μm to 20 μm is 5% by number or more; and
   (7) a portion of the carbon material with the sphericity of 0.7 or less and a particle size of 10 μm or less is 0.3% by number or less.

2. The anode material for a lithium ion secondary battery according to claim 1, wherein the carbon material satisfies at least one of the following (4) or (5):
   (4) a tap density is 1.00 g/cm³ or more;
   (5) in a case in which the carbon material is stirred in purified water containing a surfactant, and then irradiated with ultrasonic waves for 15 minutes with an ultrasonic cleaner, a ratio of D10 after the ultrasonic irradiation to D10 before the ultrasonic irradiation (D10 after ultrasonic irradiation/D10 before ultrasonic irradiation) is 0.90 or more.

3. The anode material for a lithium ion secondary battery according to claim 1, wherein an average interplanar spacing $d_{002}$ determined by an X-ray diffraction method is from 0.334 nm to 0.338 nm.

4. The anode material for a lithium ion secondary battery according to claim 1, wherein an R value in Raman spectrometry is from 0.1 to 1.0.

5. The anode material for a lithium ion secondary battery according to claim 1, wherein the carbon material does not have two or more exothermic peaks in a temperature range of from 300° C. to 1,000° C. in a differential thermal analysis in an air stream.

6. The anode material for a lithium ion secondary battery according to claim 1, wherein a specific surface area of the carbon material determined from a nitrogen adsorption measurement at 77 K is from 2 m²/g to 8 m²/g.

7. The anode material for a lithium ion secondary battery according to claim 6, wherein a $CO_2$ adsorption amount per unit area calculated by the following Formula (a):

$$CO_2 \text{ adsorption amount per unit area } (cm^3/m^2) = A \ (cm^3/g)/B \ (m^2/g) \qquad \text{Formula (a)},$$

in which A represents a value of $CO_2$ adsorption amount of the carbon material determined from carbon dioxide adsorption at 273 K, and B represents a value of a specific surface area of the carbon material determined by a nitrogen adsorption measurement at 77 K;

is from 0.01 cm³/m² to 0.10 cm³/m².

8. A method of producing an anode material for a lithium ion secondary battery, comprising a step of producing the carbon material according to claim 1 by heat-treating a mixture containing a first carbon material that becomes a core of the carbon material and a precursor of a second carbon material having a crystallinity lower than the first carbon material.

9. The method of producing the anode material for a lithium ion secondary battery according to claim 8, wherein the mixture is heat-treated in the step in a range of from 950° C. to 1,500° C.

10. An anode for a lithium ion secondary battery, comprising an anode material layer including the anode material for a lithium ion secondary battery according to claim 1, and a current collector.

11. A lithium ion secondary battery, comprising the anode for a lithium ion secondary battery according to claim 10, a cathode, and an electrolytic solution.

12. The anode material for a lithium ion secondary battery according to claim 1, wherein D90/D10 of particle sizes is 1.8 or less.

13. An anode material for a lithium ion secondary battery, the anode material comprising a carbon material satisfying the following (1), (2), (4), (6), and (7):
   (1) an average particle size (D50) is 22 μm or less;
   (2) D90/D10 of particle sizes is 2.0 or less;
   (4) a tap density is 1.00 g/cm³ or more;
   (6) a portion of the carbon material with a sphericity of from 0.6 to 0.8 and a particle size of from 10 μm to 20 μm is 5% by number or more; and
   (7) a portion of the carbon material with the sphericity of 0.7 or less and a particle size of 10 μm or less is 0.3% by number or less.

14. The anode material for a lithium ion secondary battery according to claim 13, wherein the carbon material satisfies at least one of the following (3) or (5):
   (3) a linseed oil absorption amount is 50 mL/100 g or less;
   (5) in a case in which the carbon material is stirred in purified water containing a surfactant, and then irradiated with ultrasonic waves for 15 minutes with an ultrasonic cleaner, a ratio of D10 after the ultrasonic irradiation to D10 before the ultrasonic irradiation (D10 after ultrasonic irradiation/D10 before ultrasonic irradiation) is 0.90 or more.

15. The anode material for a lithium ion secondary battery according to claim 13, wherein D90/D10 of particle sizes is 1.8 or less.

16. An anode material for a lithium ion secondary battery, the anode material comprising a carbon material satisfying the following (1), (2), and (5) to (7):
   (1) an average particle size (D50) is 22 μm or less;
   (2) D90/D10 of particle sizes is 2.0 or less;

(5) in a case in which the carbon material is stirred in purified water containing a surfactant, and then irradiated with ultrasonic waves for 15 minutes with an ultrasonic cleaner, a ratio of D10 after the ultrasonic irradiation to D10 before the ultrasonic irradiation (D10 after ultrasonic irradiation/D10 before ultrasonic irradiation) is 0.90 or more;

(6) a portion of the carbon material with a sphericity of from 0.6 to 0.8 and a particle size of from 10 μm to 20 μm is 5% by number or more; and (7) a portion of the carbon material with the sphericity of 0.7 or less and a particle size of 10 μm or less is 0.3% by number or less.

17. The anode material for a lithium ion secondary battery according to claim 16, wherein the carbon material satisfies at least one of the following (3) or (4):

(3) a linseed oil absorption amount is 50 mL/100 g or less;

(4) a tap density is 1.00 g/cm$^3$ or more.

18. The anode material for a lithium ion secondary battery according to claim 16, wherein D90/D10 of particle sizes is 1.8 or less.

\* \* \* \* \*